United States Patent
Fitch et al.

(10) Patent No.: US 12,512,184 B2
(45) Date of Patent: Dec. 30, 2025

(54) PARALLEL-PROCESSING SYSTEMS AND METHODS FOR HIGHLY SCALABLE ANALYSIS OF BIOLOGICAL SEQUENCE DATA

(71) Applicant: RESEARCH INSTITUTE AT NATIONWIDE CHILDREN'S HOSPITAL, Columbus, OH (US)

(72) Inventors: James R. Fitch, Westerville, OH (US); Benjamin J. Kelly, Delaware, OH (US); Peter White, Bexley, OH (US)

(73) Assignee: THE RESEARCH INSTITUTE AT NATIONWIDE CHILDREN'S HOSPITAL, Columbus, OH (US)

(*) Notice: Subject to any disclaimer, the term of this patent is extended or adjusted under 35 U.S.C. 154(b) by 1069 days.

(21) Appl. No.: 16/509,048

(22) Filed: Jul. 11, 2019

(65) Prior Publication Data

US 2020/0176084 A1 Jun. 4, 2020

Related U.S. Application Data

(63) Continuation of application No. 15/528,243, filed as application No. PCT/US2015/061924 on Nov. 20, 2015, now abandoned.

(Continued)

(51) Int. Cl.
*G16B 50/30* (2019.01)
*G16B 30/00* (2019.01)
(Continued)

(52) U.S. Cl.
CPC ............. *G16B 50/30* (2019.02); *G16B 30/00* (2019.02); *G16B 30/10* (2019.02); *G16B 50/00* (2019.02)

(58) Field of Classification Search
CPC ........ G16B 30/00; G16B 30/10; G16B 30/20; G16B 50/00; G16B 50/30
See application file for complete search history.

(56) References Cited

U.S. PATENT DOCUMENTS 9,552,458 B2 1/2017 White et al.
2003/0194724 A1 10/2003 Sorenson
(Continued)

FOREIGN PATENT DOCUMENTS

EP 2759953 A1 7/2014
JP 2005-182815 7/2005
(Continued)

OTHER PUBLICATIONS

Schatz, M.C. CloudBurst: highly sensitive read mapping with MapReduce. Bioinformatics, 25(11), pp. 1363-1369. (Year: 2009).*
(Continued)

*Primary Examiner* — Olivia M. Wise
*Assistant Examiner* — Janna Nicole Schultzhaus
(74) *Attorney, Agent, or Firm* — Samantha R. Smart

(57) ABSTRACT

An apparatus includes a set of hardware processors and a memory configured to store a sequence. The sequence includes a set of elements. Hardware processors are configured to implement a segment processing module, and an assignment module. The assignment module receives the sequence and assigns each element to at least one segment from a set of segments, including, when an element maps to at least a first segment and a second segment, assigning the element to both the first segment and the second segment. A segment processing module is configured to substantially simultaneously, for each segment from a set of segments specific to that one or more hardware processors, remove at least a portion of duplicate elements to generate a deduplicated segment. The segment processing module reorders the (Continued)

elements in the deduplicated segment to generate a realigned segment that has a reduced alignment errors.

19 Claims, 31 Drawing Sheets

Related U.S. Application Data

(60) Provisional application No. 62/083,000, filed on Nov. 21, 2014.

(51) Int. Cl.
    *G16B 30/10*     (2019.01)
    *G16B 50/00*     (2019.01)

(56) References Cited

U.S. PATENT DOCUMENTS

| | | |
|---|---|---|
| 2011/0177517 A1 | 7/2011 | Rava et al. |
| 2012/0264632 A1 | 10/2012 | Leamon et al. |
| 2013/0311106 A1 | 11/2013 | White et al. |
| 2013/0338934 A1 | 12/2013 | Asadi et al. |
| 2013/0345070 A1 | 12/2013 | Drmanac |
| 2014/0371110 A1 | 12/2014 | Van Rooyen et al. |
| 2017/0220732 A1 | 8/2017 | White et al. |

FOREIGN PATENT DOCUMENTS

| | | |
|---|---|---|
| JP | 2006-120143 A | 5/2006 |
| JP | 2012-78880 A | 4/2012 |
| JP | 2014-529109 A | 10/2014 |
| KR | 100681795 B1 | 2/2007 |
| WO | WO 2016/081866 A1 | 5/2016 |

OTHER PUBLICATIONS

Puckelwartz, M.J., Pesce, L.L., Nelakuditi, V., Dellefave-Castillo, L., Golbus, J.R., Day, S.M., Cappola, T.P., Dorn, G.W., Foster, I.T. and McNally, E.M. Supercomputing for the parallelization of whole genome analysis. Bioinformatics, 30(11), pp. 1508-1513. (Year: 2014).*

Kelly, et al. Churchill: an ultra-fast, deterministic, highly scalable and balanced parallelization strategy for the discovery of human genetic variation in clinical and population-scale genetic variation in clinical and population-scale genomics. Genome biology, 16, pp. 1-14. (Year: 2015).*

Canadian Patent Office—Office Action dated Dec. 20, 2021. (4 pages).

Australian Government Examination Report No. 1 for Standard Patent Application dated Mar. 30, 2021. (4 pages).

Challis et al., An integrative variant analysis suite for whole exome next-generation sequencing data. BMC Bioinformatics, Jan. 2012, pp. 1471-2105, vol. 13:8. Springer Science+Business Media, Germany.

Cock et al., The Sanger FASTQ file format for sequences with quality scores, and the Solexa/Illumina FASTQQ variants. Nucleic Acids Research, 2010, pp. 1767-1771, vol. 38:6, Oxford University Press, United Kingdom.

Collins-Underwood et al., Genomic profiling of high-risk acute lymphoblastic leukemia. Leukemia, Aug. 2010, pp. 1676-1685, vol. 24, Macmillan Publishers Limited, Germany.

Depristo, et al., A framework for variation discovery and genotyping using next generation DNA sequencing data. Nat Genet. May 2011, pp. 491-498, vol. 43(5). Nature Publishing Group, New York, NY, USA.

Forbes, et al., COSMIC (the Catalogue of Somatic Mutations in Cancer): a resource to investigate acquired mutations in human cancer. Nucleic Acids Research, 2010, pp. 965209657, vol. 38, Oxford University Press, United Kingdom.

Lam et al., Detecting and annotating genetic variations using the HugeSeq pipeline. Nat Biotechnol, Mar. 2012, pp. 226-229, vol. 30(3), Nature Publishing Group, New York, NY, USA.

Langmead et al., Searching for SNPs with cloud computing. Genome Biology, Nov. 2009, pp. R134.1-R134.10m vol. 10:R134, Biomed Central Ltd., United Kingdom.

Li et al., Fast and accurate short read alignment with Burrows-Wheeler transform. Bioinformatics, May 2009, pp. 1754-1760, vol. 25(14), Oxford University Press, United Kingdom.

Li et al., The Sequence Alignment/Map format and SAMtools. Bioinformatics, May 2009, pp. 2078-2079, vol. 25(16), Oxford University Press, United Kingdom.

Marin et al., Assessment of BCR-ABL1 Transcript Levels at 3 Months Is the Only Requirement for Predicting Outcome for Patients With Chronic Myeloid Leukemia Treated With Tyrosine Kinase Inhibitors. J Clin Oncol, Jan. 2012, pp. 232-238, vol. 30(3), American Society of Clinical Oncology, USA.

Mckenna et al., The Genome Analysis Toolkit: A MapReduce framework for analyzing next-generation DNA sequencing data. Genome Research, Jul. 2010, pp. 1297-1303, vol. 20, Cold Spring Harbor Laboratory Press, Woodbury, NY, USA.

Smith et al., Identification of common molecular subsequences. J Mol. Biol. Mar. 1981, pp. 195-197, vol. 147(1), Academic Press Inc. (London) Ltd., United Kingdom.

International Search Report and Written Opinion of the International Searching Authority dated Feb. 4, 2016, in priority international application PCT/US2015/061924, filed Nov. 20, 2015. (9 pages).

English translation/machine of KR100681795 B1. (6 pages).

Kelly, BJ et al. Churchill: an ultra-fast, deterministic, highly scalable and balanced parallelization strategy for the discovery of human genetic variation in clinical and population-scale genomics. Genome Biol., 16(1):6, Jan. 20, 2015, pp. 1-14. (14 pages).

Puckelwartz, MJ et al. Supercomputing for the parallelization of whole genome analysis. Bioinformatics, 30(11), Jun. 1, 2014 (Epub Feb. 12, 2014), pp. 1508-1513. (6 pages).

Dries Decap et al. Halvade: scalable sequence analysis with MapReduce, Bioinformatics. vol. 31, Issue 15, Aug. 2015, pp. 2482-2488. (7 pages).

Schatz, MC. CloudBurst: highly sensitive read mapping with MapReduce. Bioinformatics. vol. 25(11), Jun. 1, 2009 (Epub Apr. 8, 2009), pp. 1363-1369. (7pages).

Lam, H et al. Detecting and annotating genetic variations using the HugeSeq pipeline. Nat. Biotechnol, vol. 30(3), 2012 (available in PMC Jan. 20, 2016). (9 pages).

Scaling variant detection pipelines for whole genome sequencing analysis. Webpage:https//bcbio.wordpress.com, May 22, 2013, retrieved Jun. 10, 2024. (6 pages).

Mckenna, A et al. The Genome Analysis Toolkit: a MapReduce framework for analyzing next-generation DNA sequencing data. Genome Res, vol. 20(9), Sep. 2010 (Epub Jul. 19, 2010), pp. 1297-1303. (7 pages).

Pandey, RV et al. DistMap: a toolkit for distributed short read mapping on a Hadoop cluster. PLoS One, vol. 8(8), Aug. 23, 2013. (8 pages).

Tarasov, A et al. Sambamba: fast processing of NGS alignment formats. Bioinformatics, vol. 31(12), Jun. 15, 2015, pp. 2032-2034. (3 pages).

Massie, Matt et al. ADAM: Genomics Formats and Processing Patterns for Cloud Scale Computing. EECS Department, University of California, Berkeley, Technical Report No. UCS/EECS-2013-207, Dec. 15, 2013. (24 pages).

Webpage:https://www.genome.gov.genetics -Mapping#:~:text= Mapping%20refers%20to%20the%20process,within%20a% 20chromosome%20or%20genome, Dated Jun. 26, 2024. (4 pages).

Smith, TF et al. Identification of common molecular subsequences. J Mol Biol vol. 147(1), Mar. 25, 1981, pp. 195-197. (3 pages).

Bozdağ et al., "Parallel Short Sequence Mapping for High Throughput Genome Sequencing," IEEE, 2009, 10 pages.

Extended European Search Report in EP Application No. 15860295. 3, dated Jun. 22, 2018, 12 pages.

European Office Action in EP Application No. 15860295.3, dated Jul. 2, 2020, 8 pages.

(56) References Cited

OTHER PUBLICATIONS

Japanese Office Action in Japanese Application No. 2017-526926, dated Jan. 22, 2020, and English translation, 7 pages.
Koboldt et al., "Massively Parallel Sequencing Approaches for Characterization of Structural Variation," Methods Mol Biol., 2012, 838:369-384.
Meldrum et al., "Next-Generation Sequencing for Cancer Diagnostics: a Practical Perspective," Clin Biochem Rev, Nov. 2011, vol. 32, pp. 177-195.

* cited by examiner

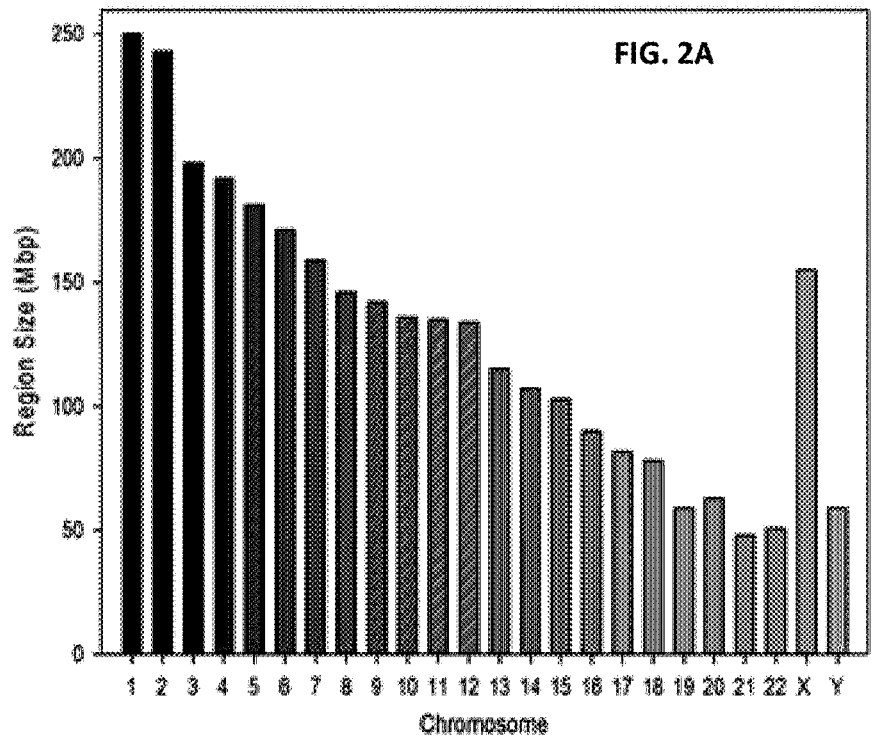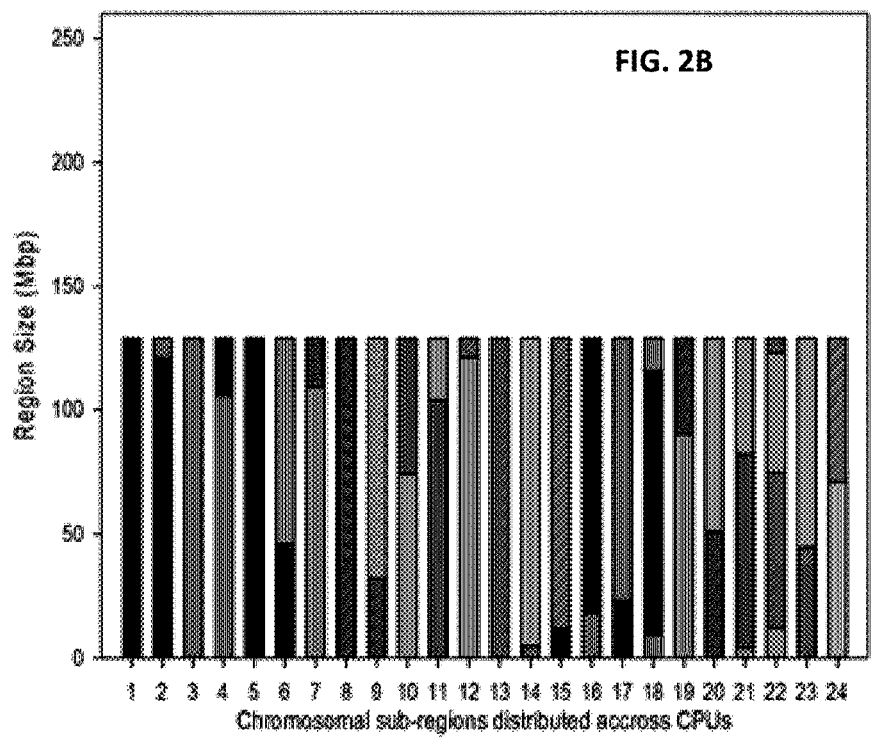

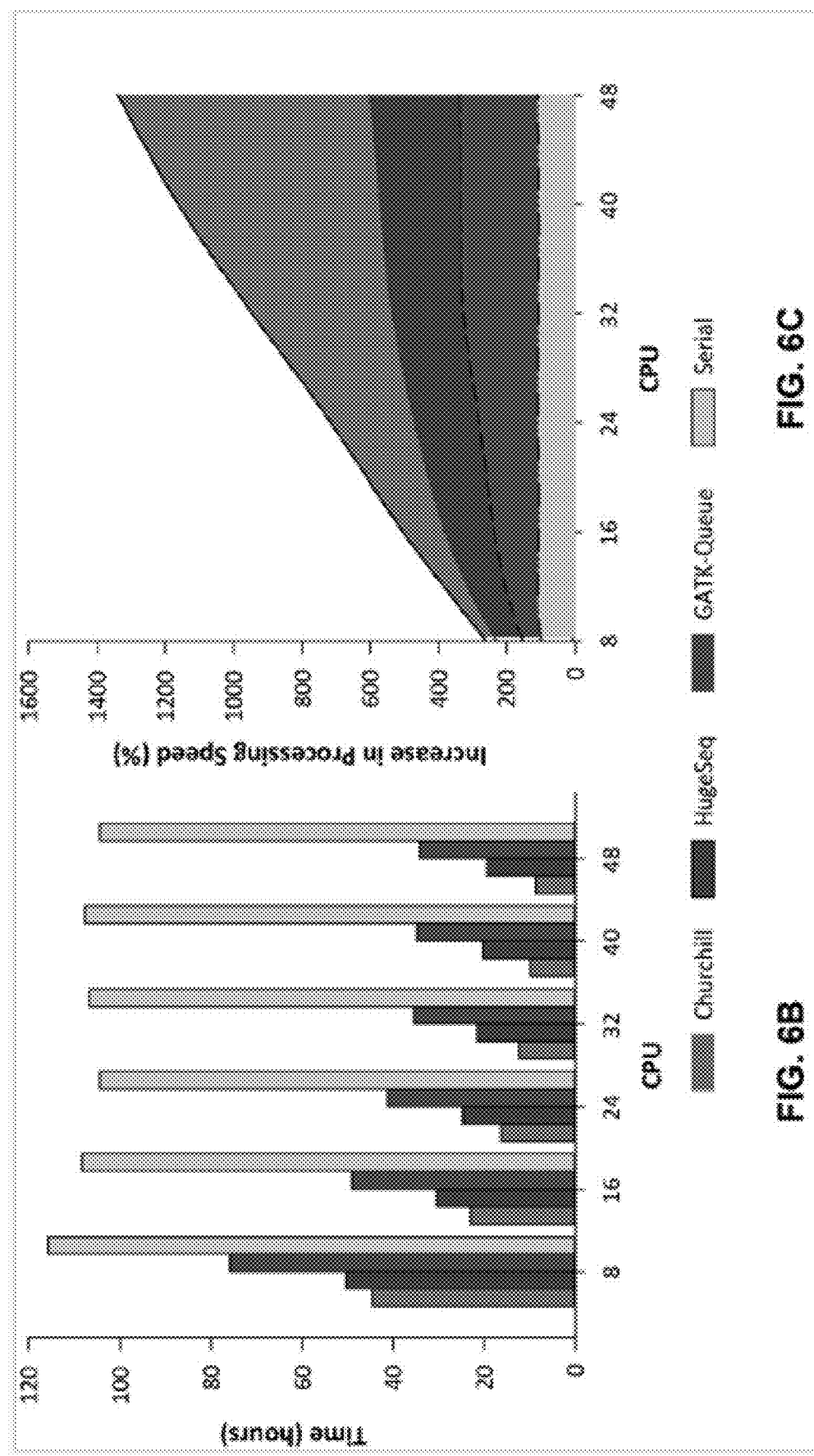

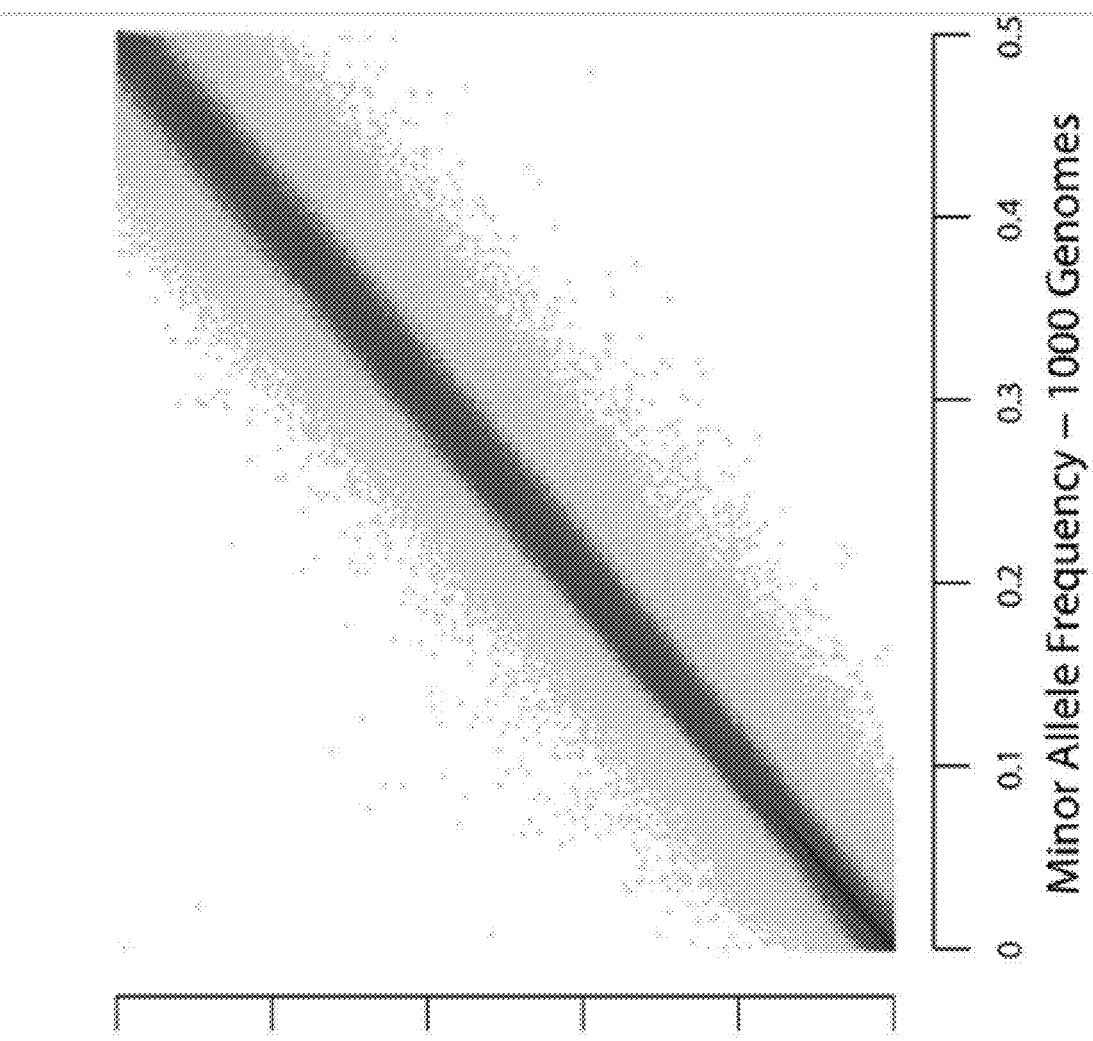
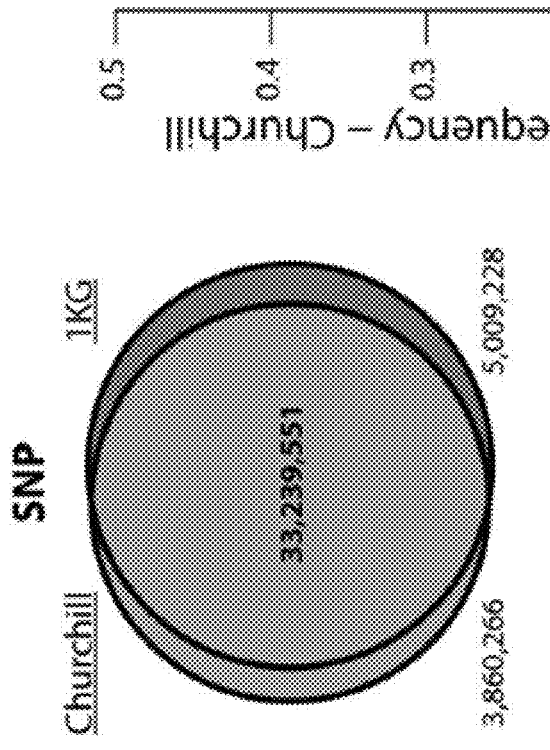
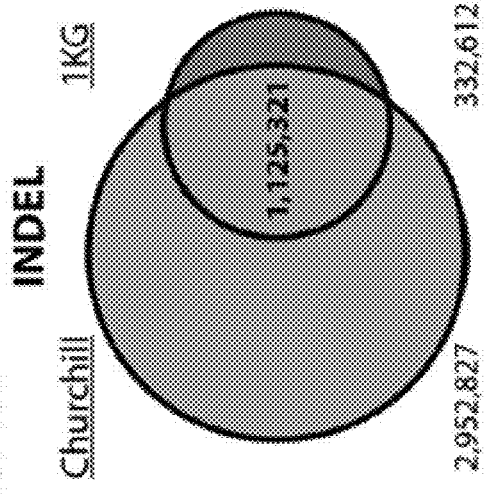
FIG. 10A
FIG. 10B
FIG. 10C

PARALLEL-PROCESSING SYSTEMS AND METHODS FOR HIGHLY SCALABLE ANALYSIS OF BIOLOGICAL SEQUENCE DATA

CROSS-REFERENCE TO RELATED APPLICATIONS

This application is a continuation of U.S. Utility application Ser. No. 15/528,243, filed May 19, 2017, which is a U.S. National Phase of PCT/US2015/061924, filed Nov. 20, 2015, which claims priority to U.S. Provisional Application No. 62/083,000 titled "SYSTEMS AND METHODS FOR HIGHLY SCALABLE ANALYSIS OF GENOME SEQUENCE DATA", filed Nov. 21, 2014, the entire disclosures of which are incorporated herein by reference.

BACKGROUND

The embodiments described herein relate generally to improved speed and efficiency of multi-processing systems carrying out biological sequence data analysis. Benefits of embodiments described herein provide for fast, accurate, and deterministic genome sequence data. Advances in sequencing technology make population-scale whole genome sequencing a possibility. With the ever-increasing rate at which next generation sequencing (NGS) data is generated, it has become important to increase and/or optimize the data processing and analysis workflow to bridge the gap between big data and scientific discovery. Some known systems suggest a sample be sequenced to a depth of at least 30× coverage, ~1 billion short reads, giving a total of 100 gigabases of raw FASTQ output. Some known systems analyze this data using a computational intensive series of steps that beings with alignment of these sequence reads to a reference genome and end with detection of differences between the sample and the reference. This process of variant detection and genotyping enables accurate use of the sequence data to identify single nucleotide polymorphisms (SNPs), small insertions and deletions (indels) and structural variants.

The process of sequencing a genome via NGS technology, and subsequent data analysis to identify genetic variants has become a powerful tool for discovery in multiple species, from prokaryotes (e.g. bacteria and viruses) to eukaryotes (e.g. plants and humans). In man, NGS has enabled increases in the discovery of new functional variants m syndromic and common diseases). NGS is now seeing rapid adoption clinically, driven by recognition of NGS diagnostic utility and enhancements in quality and speed of data acquisition. NGS is transforming research in other disciplines, including forensics, microbial pathogenesis, veterinary science, and agricultural applications to name but a few. For example, NGS is enabling rapid SNP genotyping for routine screening in agricultural crops, accelerating return on investment in breeding practices and discovery of disease resistance loci.

Regardless of the species for which a genome is being sequenced, the sequential data analysis process can take days to complete without the capability of distributing the workload across multiple compute nodes. With the release of new sequencing technology enabling population-scale genome sequencing of 1000's of raw whole genome sequences monthly, current analysis approaches will be unable to keep up.

Accordingly, a need exists for analysis methods that can increase and/or optimize computational resource use of these bioinformatics tools and reduce the time taken to go from raw reads to variant calls.

SUMMARY

An apparatus includes a memory configured to store a sequence. The sequence includes an estimation of a biological sequence. The sequence includes a set of elements. The apparatus also includes a set of hardware processors operatively coupled to the memory. Each hardware processor from the set of hardware processors is configured to implement a segment processing module. The apparatus also includes an assignment module implemented in a hardware processor from the set of hardware processors. The assignment module is configured to receive the sequence from the memory, and assign each element from the set of elements to at least one segment from multiple segments, including, when an element from the set of elements maps to at least a first segment and a second segment from the multiple segments, assigning the element from the set of elements to both the first segment and the second segment. The segment processing module for each hardware processor from the set of hardware processors 1s operatively coupled to the assignment module. The segment processing module is configured to, for each segment from a set of segments specific to that hardware processor and from the multiple segments, and substantially simultaneous with the remaining hardware processors from the set of hardware processors, remove at least a portion of duplicate elements in that segment from that set of segments to generate a deduplicated segment. The segment processing module is further configured to reorder the elements in the deduplicated segment to generate a realigned segment. The realigned segment has a reduced likelihood for alignment errors than the deduplicated segment.

BRIEF DESCRIPTION OF THE DRAWINGS

FIGS. 2A-2B—Example illustration of splitting a genome into chromosomal subregions, thereby equilibrating load balancing and enabling high levels of parallelization. Parallelization by chromosome suffers from inherent load imbalance, due to the varying sizes of the human chromosomes (FIG. 2A). However, utilization of chromosomal subregions enables equilibration of the analysis load across the available processors (FIG. 2B).

FIGS. 6A-6C-Illustration of optimization and/or improvement of load balancing resulting in improved resource utilization and faster run times. Three different strategies for parallelization of whole genome sequencing secondary data analysis were compared: balanced (used by the genomic processing system—also referred to as "Churchill"), chromosomal (used by HugeSeq) and scatter-gather (used by GATK-Queue). The resource utilization, timing and scalability of the three pipelines were assessed using sequence data for a single human genome sequence dataset (30× coverage). (FIG. 6A). CPU utilization was monitored throughout the analysis process and demonstrated that the genomic processing system improved resource utilization (85%) when compared to HugeSeq (46%) and GATK-Queue (30%). (FIG. 6B). Analysis timing metrics generated with 8 to 48 cores demonstrated that the genomic processing system is 2× faster than HugeSeq, 4× faster than GATK-Queue, and 10× faster than a naïve serial implementation with in-built multithreading enabled. (FIG. 6C). The speed differential between the genomic processing system and alternatives increases as additional cores in a given compute node are used.

(FIG. 7A). Fold speedup as a function of the number of cores used was assessed across a cluster of four Dell R815 servers with the genomic processing system ("Churchill"), GATK-Queue, HugeSeq and serial analysis. For comparison the linear speedup and that predicted by Amdahl's law assuming a one-hour sequential time are also included. The genomic processing system's scalability closely matches that predicted by Amdahl's law, achieving in excess of a 13-fold speedup between 8 and 192 cores. In contrast, both HugeSeq and GATK-Queue showed modest improvements in speed between 8 and 24 cores (2-fold), with a maximal 3-fold speedup being achieved with 48 cores, and no additional increase in speed beyond 48 cores. (FIG. 7B). Timing results for different steps of the genomic processing system were assessed with increasing numbers of cores. Complete human genome analysis was achieved in three hours by the genomic processing system using an in-house cluster with 192 cores and in 100 minutes at the Ohio Supercomputer Center (Glenn Cluster utilizing 700 cores). Results were confirmed using both the Pittsburgh Supercomputing Center and Amazon Web Services EC2.

(FIG. 9A). CPU utilization on a single r3.8× large AWS EC2 instance (32 cores) was monitored throughout the analysis process and demonstrated that Churchill improved resource utilization (94%) when compared with bcbio-nextgen (57%), enabling the entire analysis to be completed in under 12 hours with a single instance. (FIG. 9B). Unlike bcbio-nextgen, Churchill enables the analysis process to be efficiently scaled across multiple compute nodes resulting in significantly reduced run times. With 16 AWS EC2 instances the entire analysis could be completed in approximately 104 minutes, with the variant calling and genotyping with GATK HaplotypeCaller stage taking approximately 24 minutes of the total run time.

FIGS. 10A-10C-Enabling population-scale whole human genome sequence analysis. The genomic processing system ("Churchill") was used to analyze 1088 of the low-coverage whole-genome samples that were included in "phase 1" of the 1000 Genomes Project (1 KG). Raw sequence data for the entire population was used to generate a single multi-sample VCF in 7 days using 400 Amazon Web Services EC2 instances (cc2.8× large spot instances). The resulting Churchill filtered VCF was then compared to the 1 KG Consortium's VCF, with Churchill calling 41.2M variants and the 1 KG VCF file containing 39.7M. The two VCF file sets had a total of 34.4M variant sites in common. (FIG. 10A). 33.2M SNPs were called in common, with validation rates against known SNPs being highly similar: 52.8% (Churchill) and 52.4% (1 KG). (FIG. 10B). Churchill called three-fold more indels, of which 19.5% were known compared with 12.5% in the 1 KG indel set. The indels unique to Churchill have a 7-fold higher rate of validation with known variants than those unique to 1 KG. (FIG. 10C). Minor allele frequencies were compared for the 34.3M variants with the same minor allele and a density binned scatter plot was produced (scaled from low to high density frequencies). The results from Churchill and the original 1 KG analysis demonstrated highly concordant minor allele frequencies (R2=0.9978, p-value<2.2e-16).

DETAILED DESCRIPTION

As used in this specification, the singular forms "a," "an" and "the" include plural referents unless the context clearly dictates otherwise.

As used herein the term "module" refers to any assembly and/or set of operatively-coupled electrical components that can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

Figure 11:
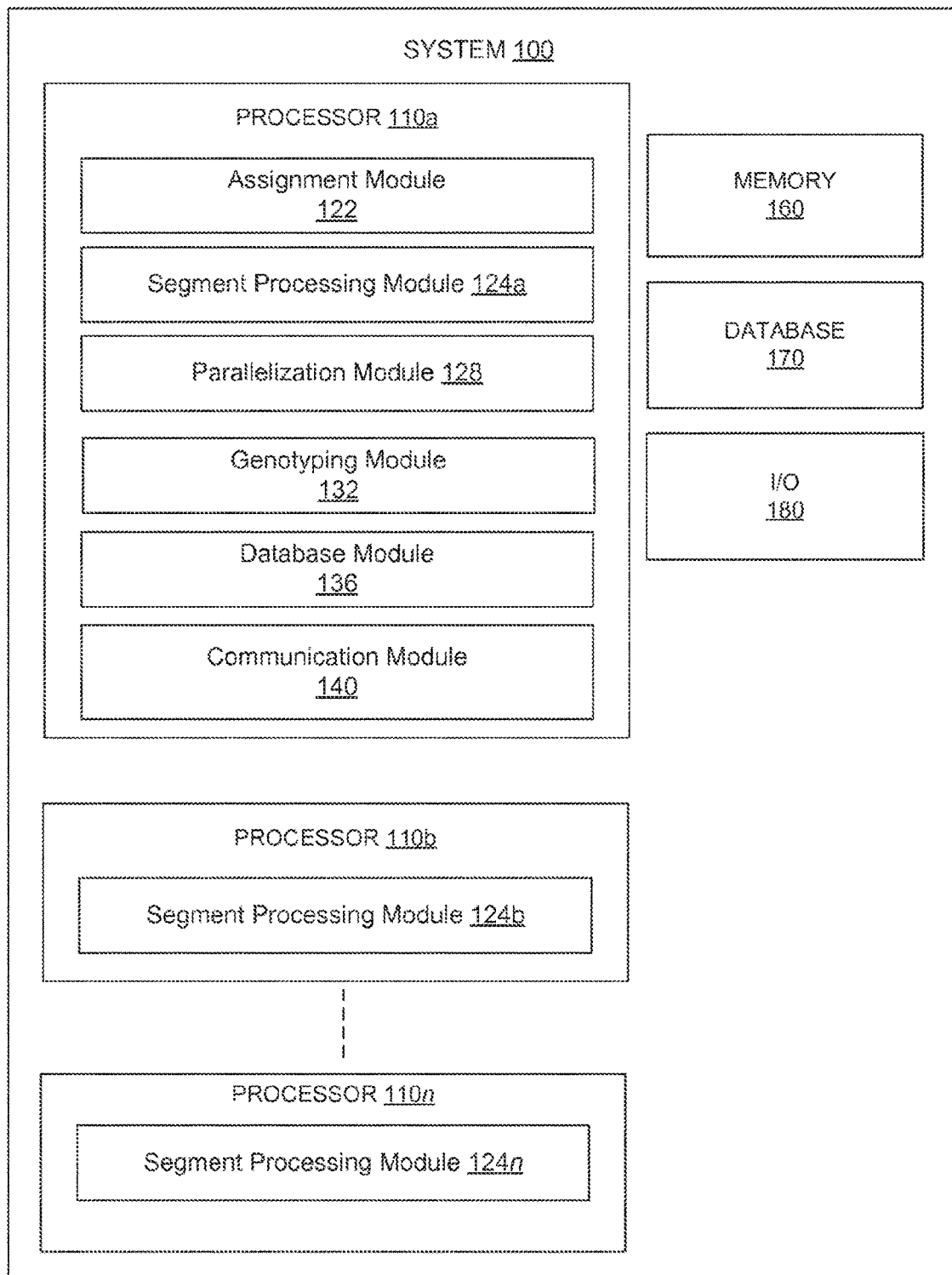
FIG. 11—An illustration of a system for genomic processing, according to embodiments.

FIG. 11 illustrates a system 100 for genomic processing, according to an embodiment. The system 100 is operable for use by entities such as users, user devices, other genomic processing devices, and/or the like. The system 100 can be a personal computer, a server, a work station, a tablet, a mobile device, a cloud computing environment (e.g., including one or more servers, processors, etc.), an application or a module running on any of these platforms, and/or the like.

The system 100 can be in communication with other devices (not shown) via, for example, one or more networks, each of which can be any type of network such as, for example, a local area network (LAN), a wide area network (WAN), a virtual network, a telecommunications network, a data network, and/or the Internet, implemented as a wired network and/or a wireless network. In some embodiments, any or all communications can be secured using any suitable type and/or method of secure communication (e.g., secure sockets layer (SSL)) and/or encryption. In other embodiments, any or all communications can be unsecured.

In some embodiments, the system 100 can be in direct and/or non-networked communication with genomic processing devices (not shown) such as, for example, DNA sequencers, any suitable genomic sequence data generator, and/or the like.

Figure 1:
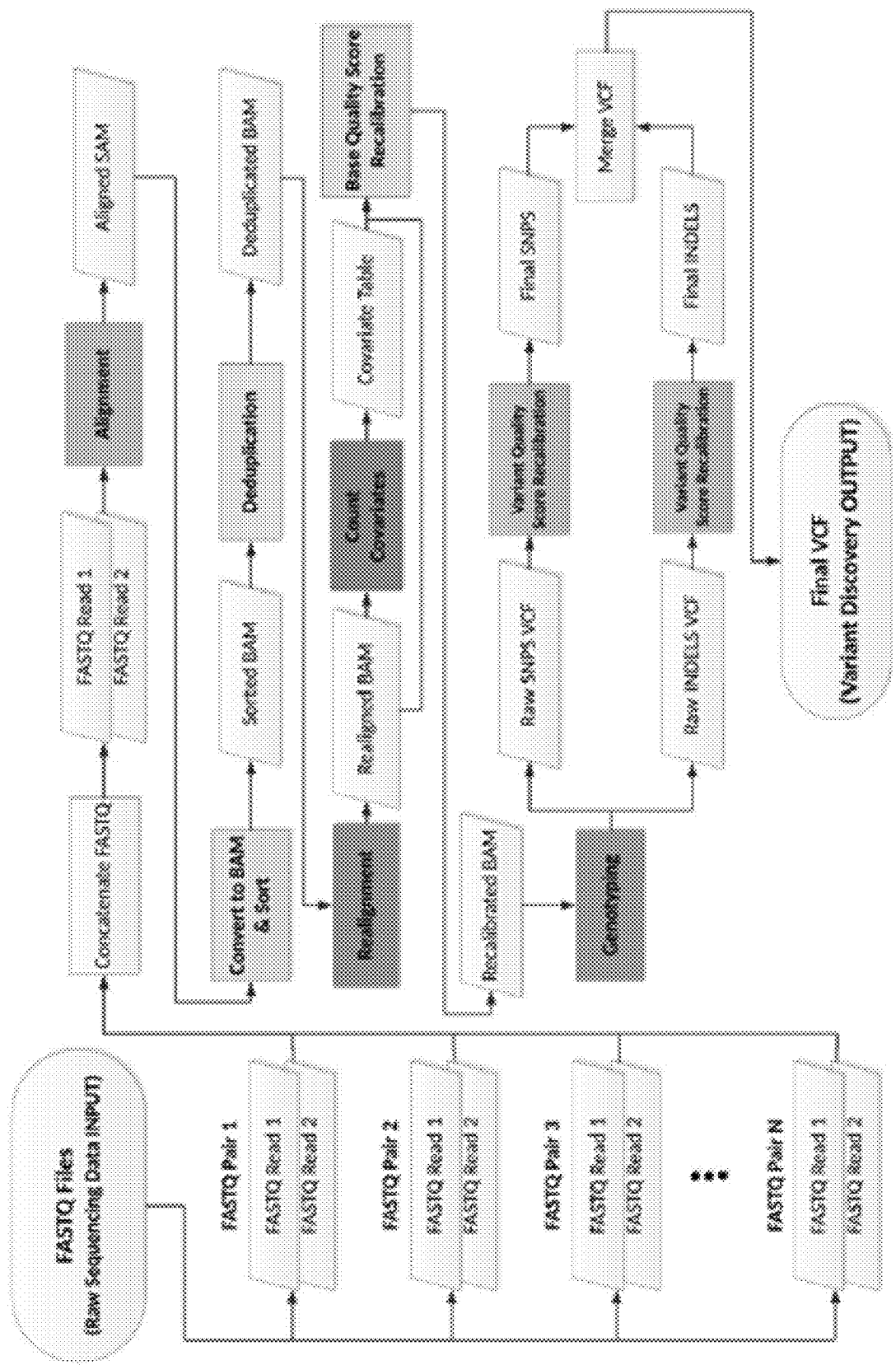
FIG. 1—Illustration of serial data processing steps for the analysis of genome resequencing data, according to an embodiment. Making SNP and indel calls can include, for example: (1) initial read alignment; (2) removal of duplicate reads; (3) local realignment around indels; (4) recalibration of base quality scores; and (5) variant discovery and genotyping. These steps are the same for deep and low-pass whole genomes, whole exomes and targeted resequencing.

As illustrated in FIG. 11, the system 100 includes at least a processor 110a and a memory 160. In some embodiments, and as also illustrated in FIG. 1, the system 100 can further include additional processors 110b-110n. In some embodiments, at least some of the processors 110a-110n are configured to execute in parallel. In some embodiments, at least some of the processors 110a-110n are configured to execute in series.

FIG. 11 also illustrates a database 170, although it will be understood that, in some embodiments, the database 170 and the memory 160 can be a common data store. In some embodiments, the database 170 constitutes one or more databases. Further, in other embodiments (not shown), at least one database can be external to the system 100. FIG. 11 also illustrates an input/output (I/O) component 180, which can depict one or more input/output interfaces, implemented in software and/or hardware, such as for interacting with user devices, genomic processing devices, and/or for other entities interacting directly or indirectly with the system 100.

The memory 160 and/or the database 170 can independently be, for example, a random access memory (RAM), a memory buffer, a hard drive, a database, an erasable programmable read-only memory (EPROM), an electrically erasable read-only memory (EEPROM), a read-only memory (ROM), Flash memory, and/or so forth. The memory 160 and/or the database 170 can store instructions to cause the processor 110 to execute modules, processes and/or functions associated with the system 100.

Each of the processors 110a-110n can independently be, for example, a general purpose processor, a Field Programmable Gate Array (FPGA), an Application Specific Integrated Circuit (ASIC), a Digital Signal Processor (DSP), and/or the like. The processors 110a-110n can be configured to run and/or execute application processes and/or other modules, processes and/or functions associated with the system 100 and/or the network. One or more of the processors 110a-11On, while illustrated in FIG. 1 as being part of the same system 100 and being associated with a common memory 160, can (in some embodiments) be coupled to the other processors via a network, and be associated with other systems/system components (not shown).

The processor 110a includes an assignment module 122, a segment processing module 124, a parallelization module 128, a genotyping module 132, a database module 136, and a communication module 140. In some embodiments, the processor 110a can include additional modules (not shown). Each module can independently be a hardware module and/or a software module (implemented in hardware, such as the processor 110a). In some embodiments, each of the modules can be operatively coupled to each other.

In some embodiments, one or more of the modules can be implemented across two or more of the processors 1 10a-1 10n, and/or be duplicated across two or more of the processors 110a-1 lOn. In some embodiments, as illustrated in FIG. 11, each of the processors 110b . . . 1 lOn includes and/or implements a corresponding segment processing module 124b . . . 124n. In some embodiments, at least one of the processors 110b . . . 11On can be on a different device, coupled to the system 100 directly or via a network.

In other embodiments, the functionality of one or more of the modules can be combined and/or overlap. For example, in some embodiments, the segment processing module 124a and the parallelization module 128 can be a single module. In some embodiments, the functionality of one or more modules and/or the interaction between the modules can be based on regulatory requirements for data processing, storage, integrity, security, and/or the like.

The communication module 140 is configured to facilitate network connectivity for the system 100. For example, the communication module 140 can include and/or enable a network interface controller (NIC), wireless connection, a wired port, and/or the like. As such, the communication module 140 can establish and/or maintain a communication session with any associated/connected genomic processing devices, user devices, and/or the like. Similarly stated, the communication module 140 can enable the system 100 to send data to and/or receive data.

The database module 136 is configured to interface with the memory 160 and/or the database 170 for data manipulation (including storage, modification, and/or deletion). For example, the database module 136 can store a representation of a genomic sequence (e.g., as a BAM file) in the memory 160 and/or the database 170.

In some embodiments, the memory 160 and/or the database 170 is configured to store a sequence that includes an estimation/approximation of a biological sequence such as, for example, the sequencing output typically generated from a DNA sequencer. In some embodiments, the sequence includes multiple elements. In some embodiments, the sequence includes quality score information, which can be any score information that is a measure of the quality of identification of individual bases in the biological sequence (e.g., a Phred quality score, or a FASTQ score). In some embodiments, each element of the sequence includes a read pair. A read pair can be generally considered a pair of reads resulting from the sequencing of the biological sequence from opposite ends (e.g., the 5' end and 3' end of a DNA sequence), each read in a pair of reads at the same position within the biological sequence.

The assignment module 122 is configured to receive the sequence, either from an external source, from the memory 160, and/or from the database 170. In some embodiments, the sequence is in a binary alignment/map (BAM) format. In some embodiments, the sequence is in a FASTQ format or a FASTA format. In some embodiments, the biological sequence is a deoxyribonucleic acid (DNA) sequence. In some embodiments, the biological sequence is a ribonucleic (RNA) sequence.

The assignment module 122 is further configured to assign each element to at least one segment or multiple segments. In some embodiments, the assignment module 122 is configured to, when an element maps to at least a first segment and a second segment, assign the element to both the first segment and the second segment. In other embodiments, the assignment module 122 is configured to, when an element maps to at least a first segment and a second segment, assign the element to one of the first segment or the second segment on any suitable basis. Each segment can be any suitable subpart of the sequence. In some embodiments, each segment substantially corresponds to an individual chromosome of the biological sequence.

In some embodiments, the assignment module 122 is configured to receive the sequence by receiving, from an external source, from the memory 160, and/or from the database 170, a first sequence that includes a forward estimation of the biological sequence. In some embodiments, the assignment module 122 is further configured to receive from an external source, from the memory 160, and/or from the database 170, a second sequence that includes a reverse estimation of the biological sequence. In some embodiments, the assignment module 122 is further configured to generate a paired sequence based on the first sequence and the second sequence. In some embodiments, the assignment module 122 is further configured to align the paired sequence with a reference sequence to generate the target sequence.

Each of the segment processing modules 124a-124n is configured to, for each segment from a set of the segments (e.g., a set of segments corresponding to a set of chromosomes in the biological sequence), remove at least a portion of duplicate elements in that segment from that set of segments to generate a deduplicated segment. In this manner, duplication errors in generating the sequence can be accounted for to prevent misreads. Each of the segment processing modules 124a-124n is further configured to, for each segment from a set of the segments, reorder/realign the elements in the deduplicated segment to generate a realigned segment, so that alignment errors between the read pairs can be minimized and/or substantially eliminated. In some embodiments, reordering/realigning includes applying a Smith-Waterman algorithm to the deduplicated segment. In some embodiments, reordering/realigning includes applying a Needleman-Wunsch algorithm to the deduplicated segment. In some embodiments, the realigned segment has a reduced likelihood for alignment errors than the deduplicated segment. In some embodiments, each of segment processing modules 124a-124n is configured to operate as described above substantially in parallel with each other segment processing module. In some embodiments, at least two of the segment processing modules 124a-124n are configured to operate as described above substantially in parallel with each other.

In some embodiments, each segment includes a portion having a first size that overlaps a portion of at least one other segment. In some embodiments, the deduplicated segment associated with each segment includes a portion having a second size that overlaps a portion of the deduplicated segment associated with another segment. In some embodiments, the realigned segment associated with each segment includes a portion having a third size that overlaps a portion of the realigned segment associated with a remaining segment from the set of segments. In some embodiments, the second size is smaller than the first size. In some embodiments, the third size is smaller than the second size. In this manner, the overlap, acting as a "buffer zone", ensures appropriate detection of variants near or spanning segment (e.g., chromosomal) boundaries, as is possible in the case of insertions and deletions ("indels").

In some embodiments, the segment processing modules 124a-124n are configured to transmit the realigned segments to the storage/database module 136 for storage in the memory 160 and/or the database 170. In some embodiments, the segment processing modules 124a-124n are configured to transmit the realigned segments to the genotyping module 132 for further processing. The genotyping module 132 is configured to receive the output from any of the other modules (e.g., the multiple segments from the assignment module 122), and is further configured to carry out any additional processing including, but not limited to reconstructing the sequence in a final form. In some embodiments, the genotyping module 132 is configured to identify regions in the final sequence that differ from a known reference for purposes of variant discovery and genotyping, and provided a list of genetic variants and genotypes, respectively.

In some embodiments, the parallelization module 128 is configured to receive the sequence and, prior to the assigning by the assignment module 122, split the sequence into a multiple subsequences. Each subsequence can be of a predetermined length such as, for example, 1000 elements (e.g., 1000 base pairs), 10000 elements, and/or the like. In some embodiments, the size of subsequences is smaller than the size of the segments.

In such embodiments, the assignment module 122 is further configured to assign by assigning each subsequence to at least one segment from the multiple segments. In some embodiments, the assignment module is further configured to execute the assigning for at least two segments in a substantially simultaneous manner. In this manner, aspects of the system 100 are configured for increased simultaneity of assigning, leading to economy in processing times.

In some embodiments, the parallelization module 128 is further configured to, for each segment, subsequent to the assigning by the assignment module 122 and prior to the removing by the segment processing module 124a or the segment processing modules 124a-124n, combine subsequences within that segment. In this manner, aspects of the system 100 are configured for, simultaneously processing each segment as a discrete entity of biological relevance.

Figure 12:
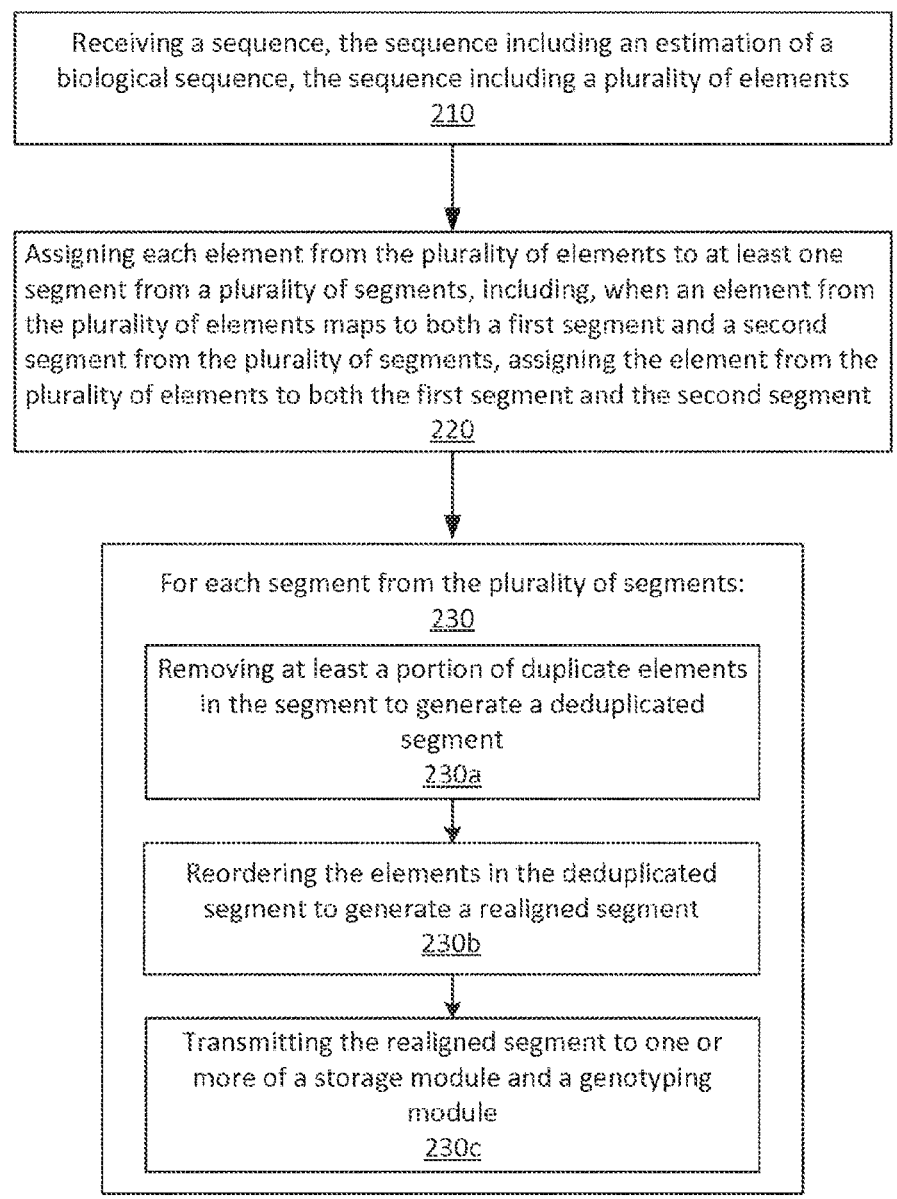
FIG. 12—An illustration of a method for genomic processing, according to embodiments.

FIG. 12 illustrates a method 200, according to an embodiment. In some embodiments, the method 200 can be implemented by the system 100, and/or a structural/functional variant thereof. The method 200 includes, at 210, receiving a sequence. The sequence includes an estimation of a biological sequence. The sequence includes multiple elements. In some embodiments, receiving the sequence includes receiving a first sequence that is a forward estimation of the biological sequence. In some embodiments, receiving the sequence also includes receiving a second sequence that is a reverse estimation of the biological sequence. In some embodiments, receiving the sequence also includes generating a paired sequence based on the first sequence and the second sequence. In some embodiments, receiving the sequence also includes aligning the paired sequence with a reference sequence to generate the target sequence.

In some embodiments, the sequence is in a binary alignment/map (BAM) format or in a FASTQ format. In some embodiments, the sequence includes quality score information. In some embodiments, each element includes a read pair. In some embodiments, the biological sequence is one of a deoxyribonucleic acid (DNA) sequence or a ribonucleic (RNA) sequence.

The method 200 also includes, at 220, assigning each element to at least one segment from multiple segments. The step 220 also includes, when an element maps to both a first segment and a second segment, assigning the element to both the first segment and the second segment.

In some embodiments, when an element maps to a first segment and a second segment, the assigning at 220 further includes assigning the first segment and the second segment to an intersegmental sequence.

The method 200 also includes at 230, for each segment, removing at least a portion of duplicate elements in the segment to generate a deduplicated segment (see substep 230a). The method also includes, at substep 230b, reordering the elements in the deduplicated segment (e.g., by applying a Smith-Waterman algorithm) to generate a realigned segment. In some embodiments, the realigned segment has a reduced likelihood for alignment errors than the deduplicated segment. The method also includes, at substep 230c, transmitting the realigned segment to a storage module (e.g., the database module 136), a genotyping module (e.g., the genotyping module 132), and/or both.

In some embodiments, the method 200 also includes, prior to assigning at 220, splitting the sequence into multiple subsequences. In such embodiments, the assigning at 220 includes assigning each subsequence to at least one segment. In such embodiments, the method also includes, for each segment, subsequent to the assigning at 220 and prior to the removing at 230a, combining subsequences within the segment.

In some embodiments, each segment includes a portion that overlaps a portion of at least one other/remaining segment. In some embodiments, each segment includes a portion having a first size that overlaps a portion of at least one other/remaining segment. In some embodiments, the deduplicated segment associated with each segment includes a portion having a second size that overlaps a portion of the deduplicated segment associated with another segment. In some embodiments, the realigned segment associated with each segment includes a portion having a third size that overlaps a portion of the realigned segment associated with another segment. In some embodiments, the second size is smaller than the first size. In some embodiments, the third size is smaller than the second size.

Figure 13:
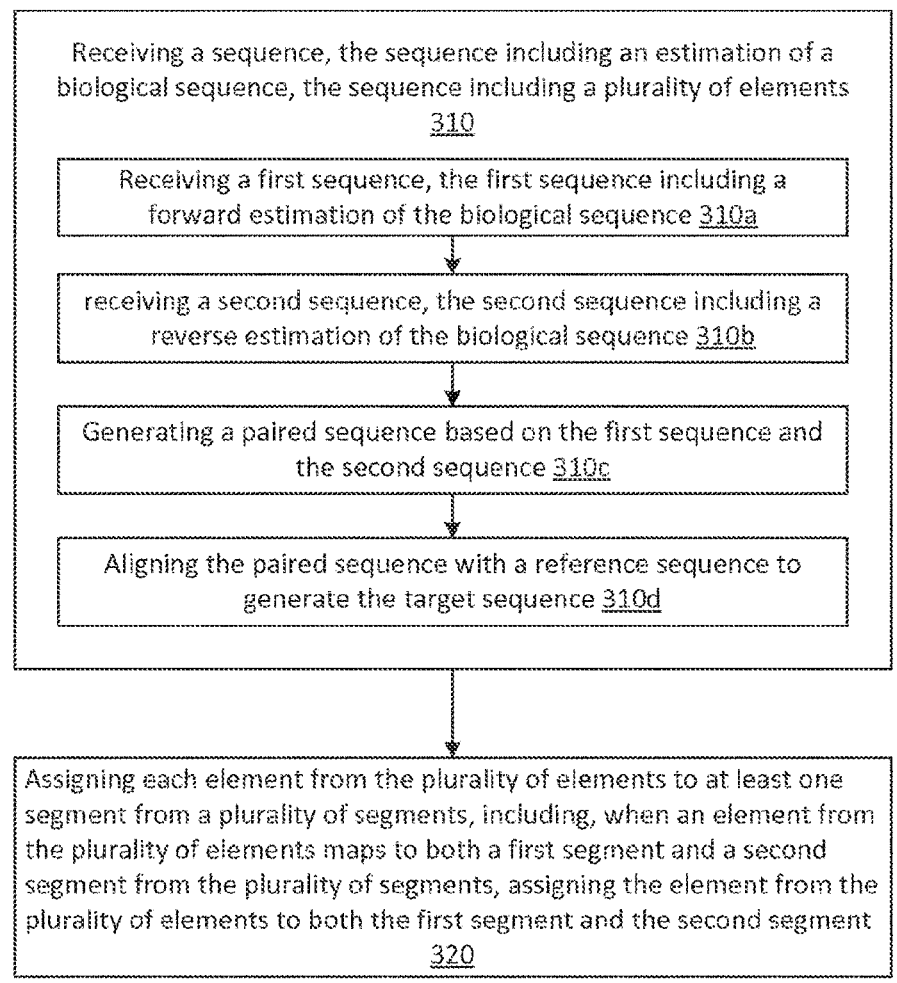
FIG. 13—An illustration of a method of the alignment module of FIG. 11, according to embodiments.

FIG. 13 illustrates a method 300 of operation of the assignment module 122, according to embodiments. The method 300 includes, at 310, receiving a sequence. In some embodiments, the sequence includes an estimation of a biological sequence. In some embodiments, the sequence including a set of elements. In some embodiments, the step 310 includes, at substep 310a, receiving a first sequence. The first sequence includes a forward estimation of the biological sequence. In some embodiments, the step 310 further includes, at substep 310b, receiving a second sequence. The second sequence includes a reverse estimation of the biological sequence. In some embodiments, the step 310 further includes, at substep 310c, generating a paired sequence based on the first sequence and the second sequence. In some embodiments, the step 310 further includes, at substep 31Od, aligning the paired sequence with a reference sequence to generate the target sequence.

The method 300 further includes, at step 320, assigning each element from the set of elements to at least one segment from multiple segments. In some embodiments, the step 320 further includes, when an element maps to both a first segment and a second segment, assigning the element to both the first segment and the second segment.

Figure 14:
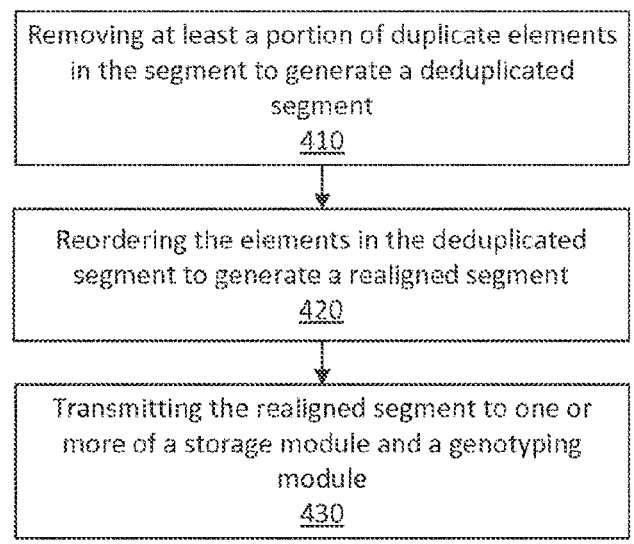
FIG. 14—An illustration of a method of the segment processing module of FIG. 11, according to embodiments.

FIG. 14 illustrates a method 400 of operation of the segment processing module 124a, according to embodiments, although it is understood that the method 400 can be representative of any of the other segment processing modules 124b-124n. The method 400, in some embodiments, is executed for each segment generated by the assignment module 122. The method 400 includes, at 410, removing at least a portion of duplicate elements in the segment to generate a deduplicated segment (or "deduplicating"). The method 400 further includes, at 420, reordering/realigning the elements in the deduplicated segment to generate a realigned segment. The method 400 further includes, at 430, transmitting the realigned segment to at least one of a storage module (e.g., the database module 136) or a genotyping module (e.g., the genotyping module 132).

Figure 15:
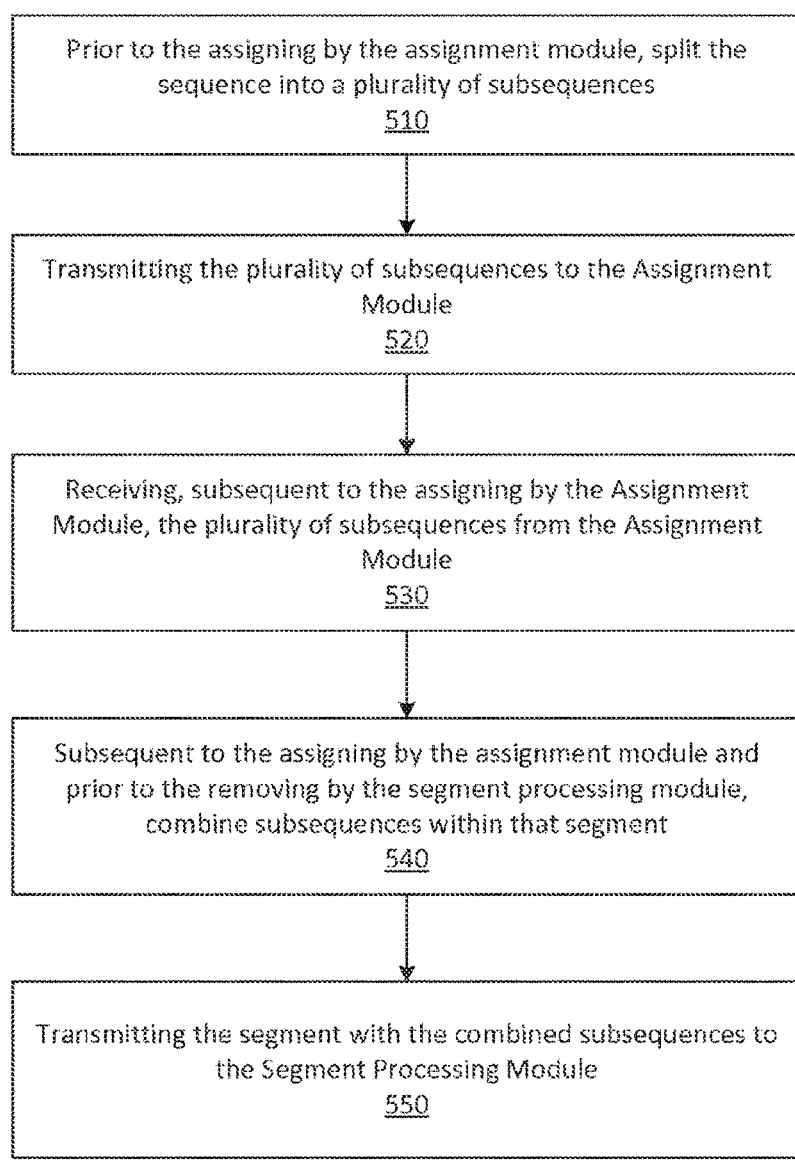
FIG. 15—An illustration of a method of the alignment module of FIG. 11, according to embodiments.

FIG. 15 illustrates a method 500 of operation of the parallelization module 128, according to embodiments. The method 500 includes, at 510, prior to the assigning by the assignment module 122, splitting the sequence into multiple subsequences. The method 500 further includes, at 520, transmitting the multiple subsequences to the assignment module 122 for processing. The method 500 further includes, at 530, receiving, subsequent to the assigning by the assignment module 122 (e.g., see FIG. 13), the subsequences from the assignment module. The method 500 further includes, at 540, subsequent to the assigning by the assignment module 122 and prior to the removing by the segment processing module(s) 124a (-124n), combine subsequences within that segment. The method 500 further includes, at 550, transmitting the segment with the combined subsequences to the segment processing module(s) 124a (-124n).

In some embodiments, a genomic processing system (e.g., the system 100 of FIG. 11) is used to process genomic data. It is understood that the genomic processing system can perform some or all of the functionality disclosed herein, and can encompass some or all of the structural aspects (e.g., various devices, systems, subsystems, computing means, apparatus, sequencers, analyzers, etc.) disclosed herein. The components of the genomic processing system can interconnect in any suitable manner to achieve the functionality disclosed herein such as, for example, a wired or wireless network that connects the output of a sequencer to a computing apparatus. In some embodiments, the genomic processing system and/or at least one component thereof includes a processor (e.g., executing one or more modules) and a memory for performing the functionality disclosed herein. In some embodiments, for example, aspects of the genomic processing system can be structurally and/or functionally similar to those disclosed in U.S. application Ser. No. 13/838,677 ("the '677 application") filed Mar. 15, 2013, titled "COMPREHENSIVE ANALYSIS PIPELINE FOR DISCOVERY OF HUMAN GENETIC VARIATION", the entire disclosure of which is incorporated herein by reference.

Figure 3A:
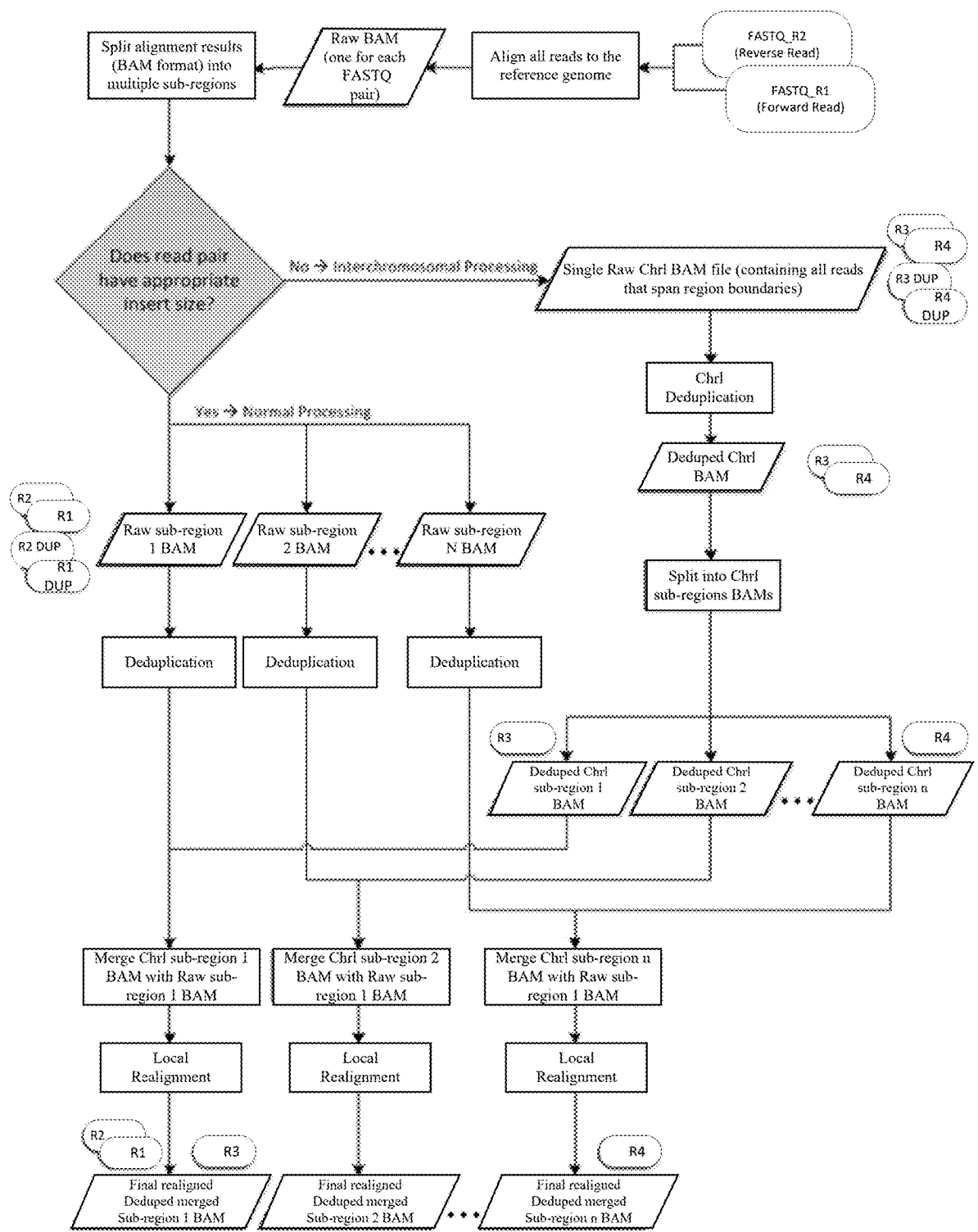
FIG. 3A-Illustration of an example parallelized deduplication method, according to an embodiment. Following alignment, reads are split into multiple subregion BAM files. If both reads in the pair map to the same region they can be placed into the appropriate subregion BAM file. Otherwise, the reads are placed in the interchromosomal (Chrl) BAM file. Once the raw aligned reads have been processed, the reads in the subregional BAMs and interchromosomal reads can then be correctly deduplicated in parallel. The deduplicated interchromosomal reads are individually merged back into their appropriate deduplicated subregion BAM. These merged subregion BAMs then undergo local realignment, defining processed subregion BAMs ready for the recalibration and genotyping steps.
Figure 3B:
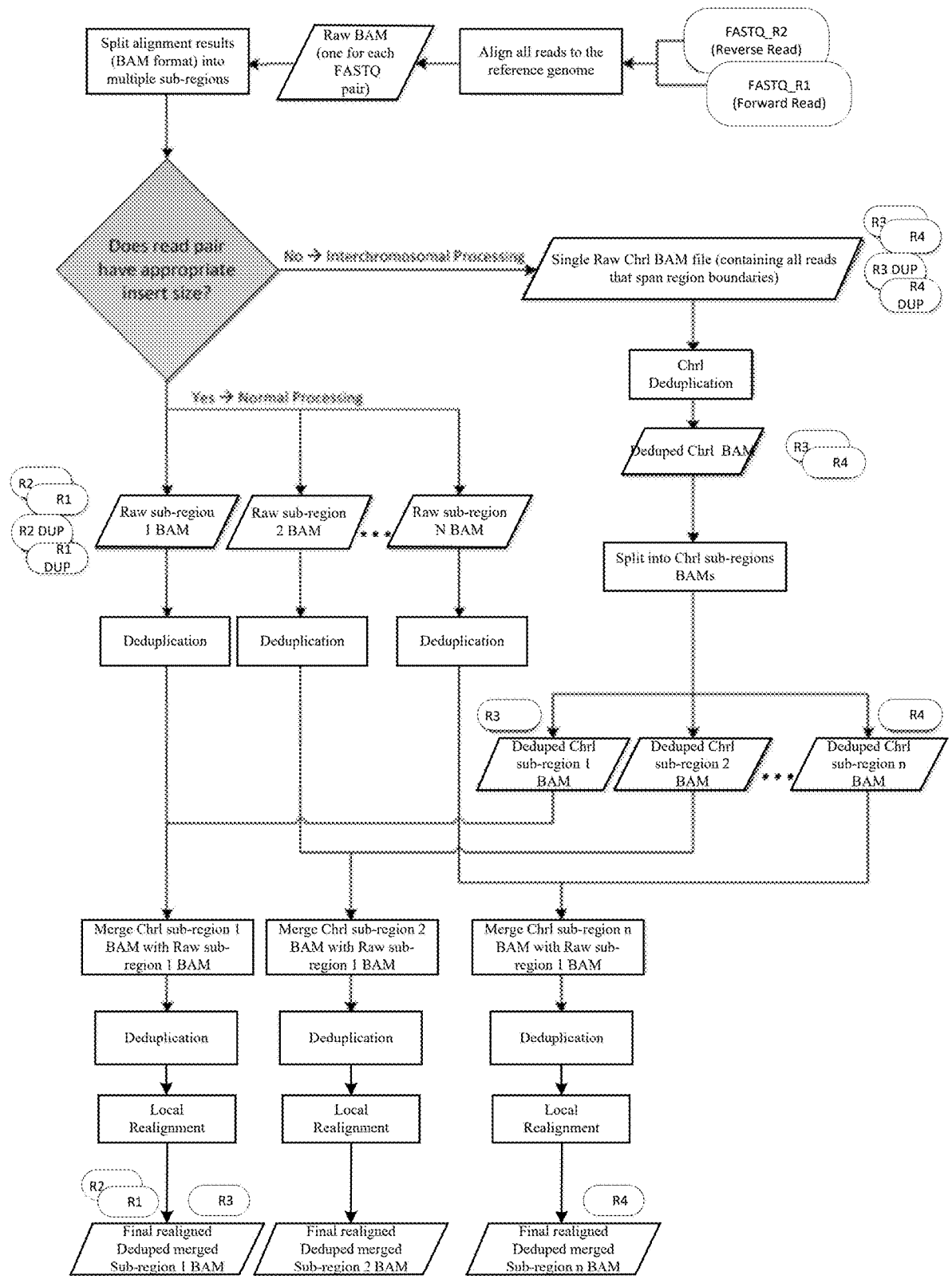
FIG. 3B-Illustration of another example parallelized deduplication method, according to an embodiment. Following alignment, reads are split into multiple subregion BAM files. If both reads in the pair map to the same region they are placed into the appropriate subregion BAM file. Otherwise, the reads are placed in the interchromosomal (ChrI) BAM file. Once the raw aligned reads have been processed, the interchromosomal reads can then be correctly deduplicated. The deduplicated interchromosomal reads are individually merged back into their appropriate subregion BAM. These merged subregion BAMs then undergo deduplication and local realignment, defining processed subregion BAMs ready for the recalibration and genotyping steps.
Figure 3C:
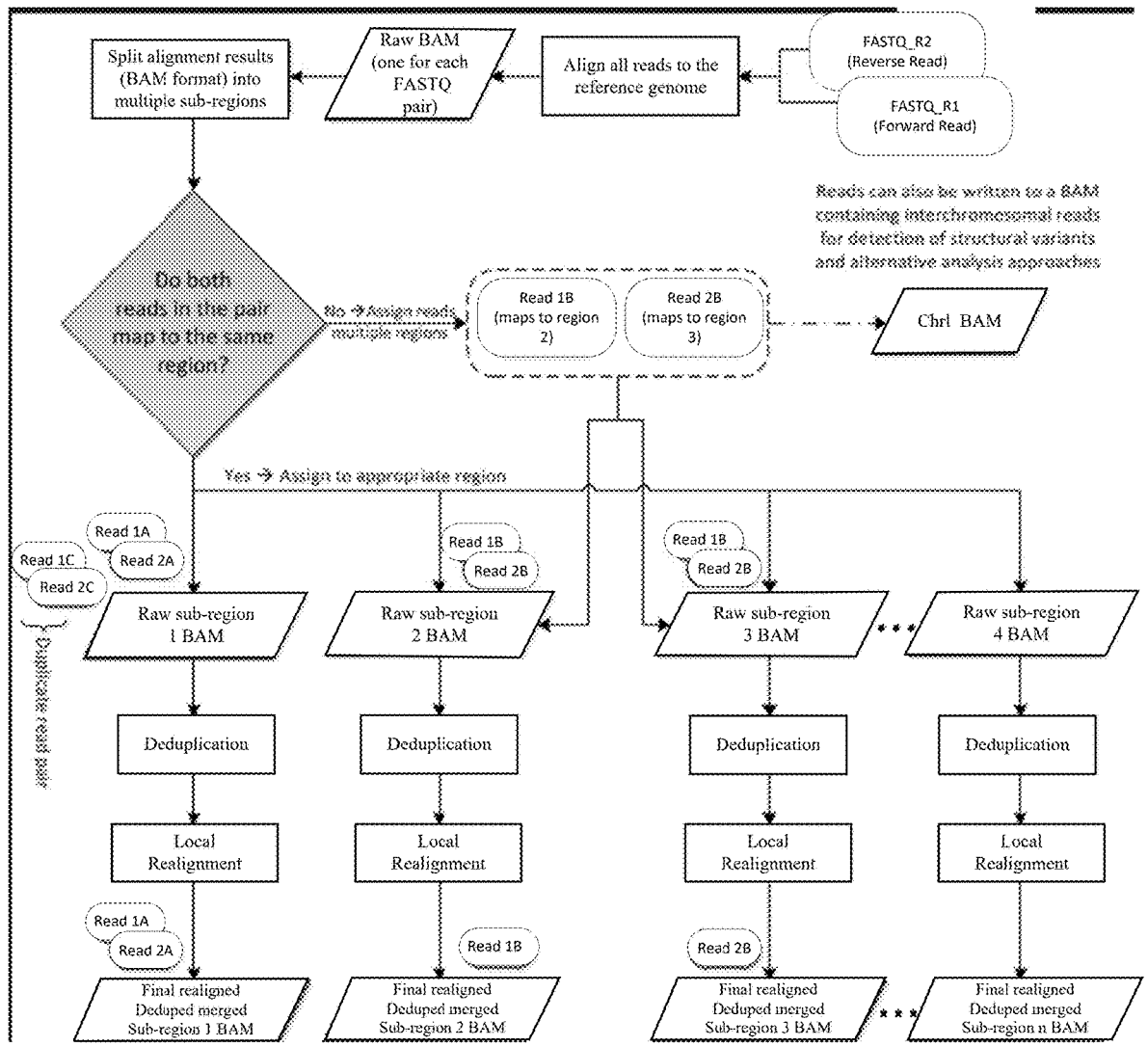
FIG. 3C-Illustration of another example parallelized deduplication method, according to an embodiment. Following alignment, reads are split into multiple subregion BAM files. If both reads in the pair map to the same region they are placed into the appropriate subregion BAM file. Otherwise, the reads are placed in both of the resulting subregional BAM files. This temporarily results in reads being duplicated in both the subregion of the first read in the pair and in the subregion of the second read in the pair. Subregional BAMs can then undergo deduplication, and the reads will be appropriately deduplicated as read pairs in different subregions are kept together. For the subsequent processing steps, the subregion overlap region is trimmed by 1000 bp prior to local realignment. This results in removal of the reads outside of the new subregional boundary, thus removing the temporarily duplicated reads created during the initial splitting step and thereby ensuring integrity of the data in the subsequent realignment, recalibration, variant calling and genotyping steps. One advantage of this method is the ability to directly stream the data from step to step in memory, reducing 1/0 and speeding up the process.
Figure 4:
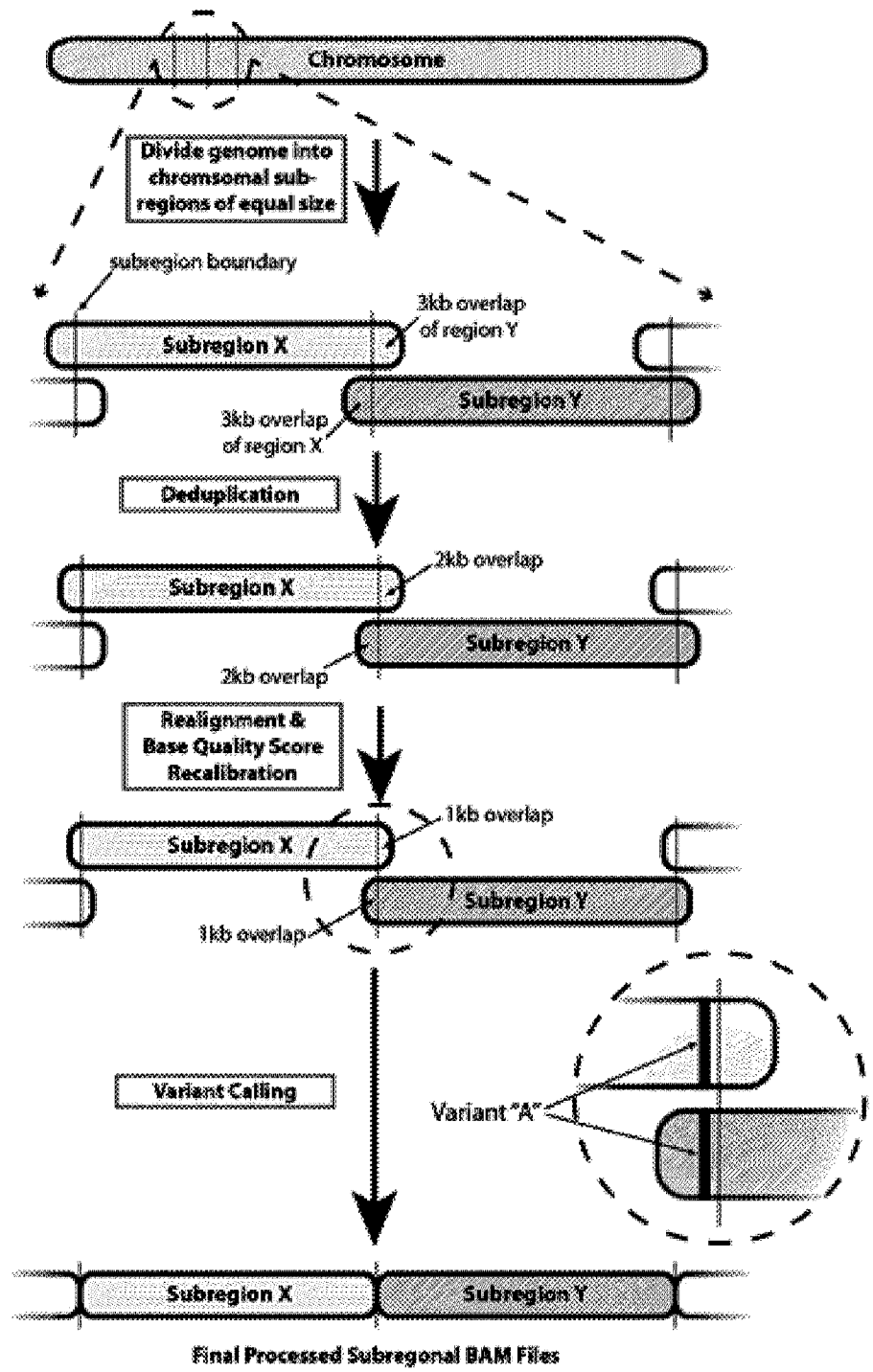
FIG. 4—Example illustration of subregion processing by the genomic processing system, according to an embodiment. Chromosomes are split into subregions for the processes of duplicate removal, realignment, base quality score recalibration, and variant calling. To ensure proper processing of regional boundaries, at both ends of each region, an overlap of the adjacent region can be included. This overlap acts as a "buffer zone" to ensure deterministic behavior and appropriate detection of variants near or spanning region boundaries, as is possible in the case of insertions and deletions (indels). The size of this buffer zone can be varied, depending on the insert size of the initial sequencing library. For example, with a standard fragment size of 500 bp, a (first size) 3,000 bp buffer zone can be used as shown in the figure above. To ensure data integrity at boundary edges, with each subsequent step in the analysis process this boundary zone is decreased. For example, deduplication can be performed on subregions with a buffer zone of 3,000 bp; next for local realignment and base quality score recalibration a buffer zone of (second size) 2,000 bp can be used. Finally, in this example, a buffer zone of (third size) 1,000 bp can be used for variant calling and genotyping. If duplicate variant calls are made in the overlapping regions (see inset diagram), the genomic processing system can assign the variant to the correct subregion. For example, Variant "A" called in the last 1,000 bp of Subregion Xis called twice, once in the processing of Subregion X and once in the processing of Subregion Y. Ultimately it is assigned to the appropriate region based on the coordinates of the original subregional boundaries, without the buffer zone.
Figure 5A:
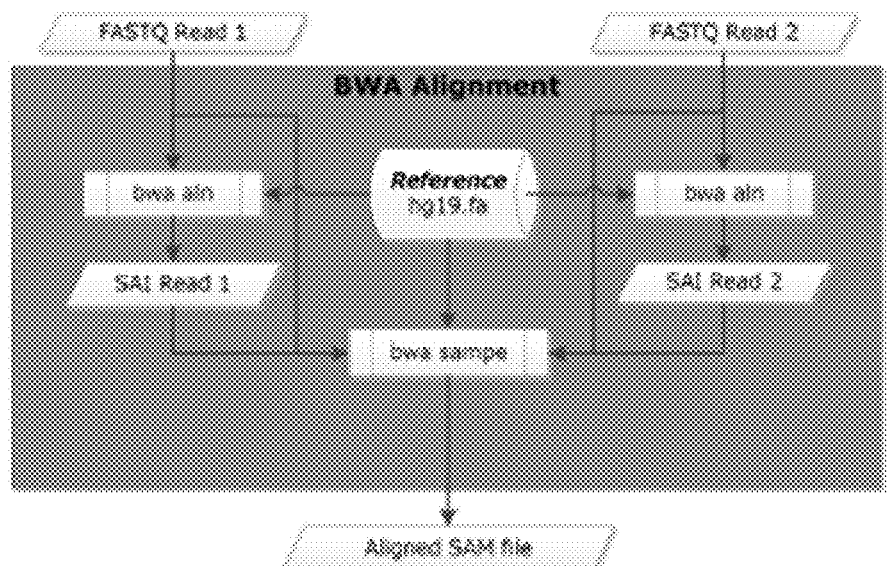
FIGS. 5A-5M-Flow representation of a parallel workflow, according to some embodiments. While in some of the FIGS. 5A-5M the workflow is illustrated for a GATK Unified Genotype, it is understood that the workflow is compatible with other suitable genotyping methods. Illustrated herein are the steps/processes of: (SA) alignment; (SB) a portion of the parallel workflow illustrating parallel alignment of read pairs; (SC) generation of subregions; (SD) realignment; (SE) deduplication; (SF) recalibration; (5G) genotyping; (SH) parallel subregion processing; (51) parallel deduplication of subregions; (SJ) parallel local realignment/reordering of subregions; (SK) parallel recalibration of subregions; (SL) parallel genotyping and variant quality filtering (VCF) of subregions; (SM) output after merging of VCF-processed subregions.
Figure 5B:
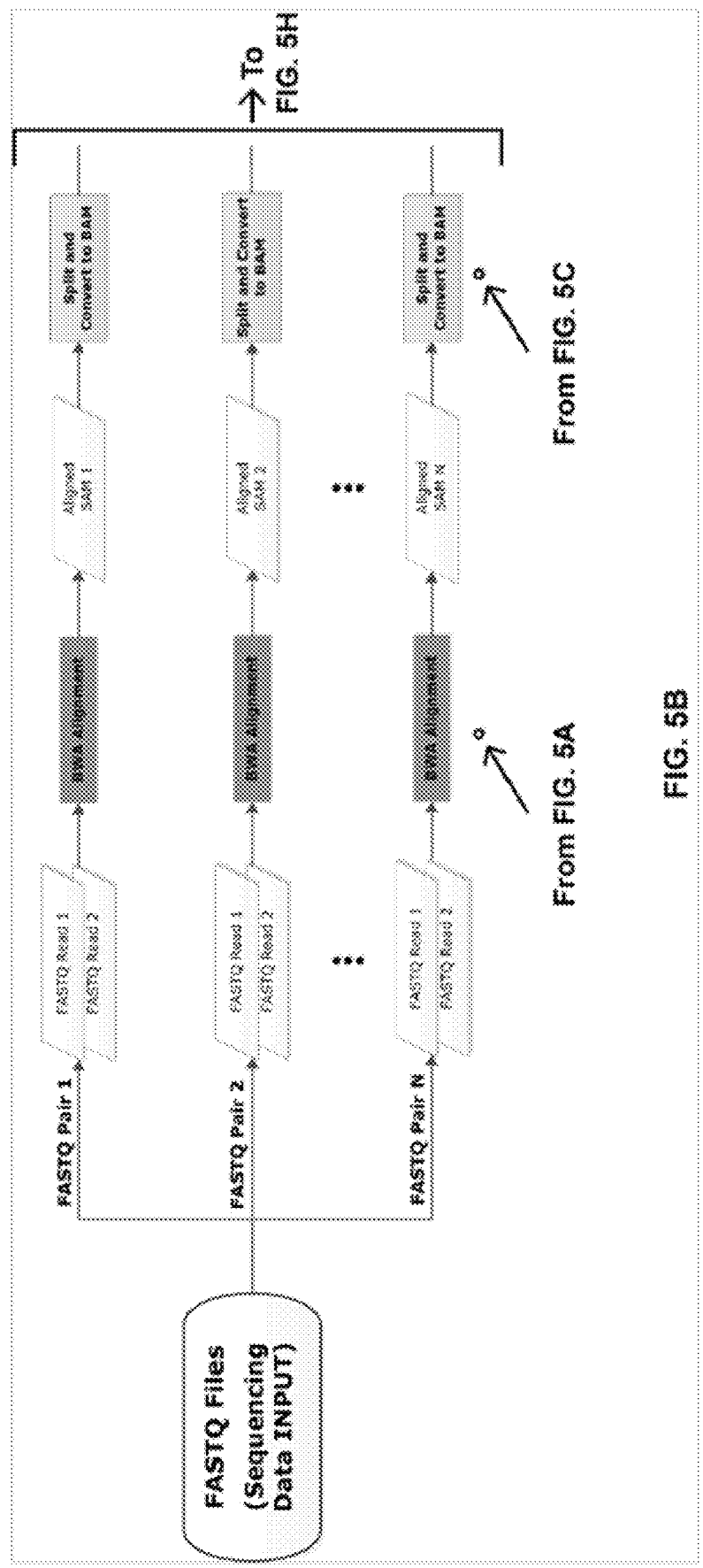
Figure 5C:
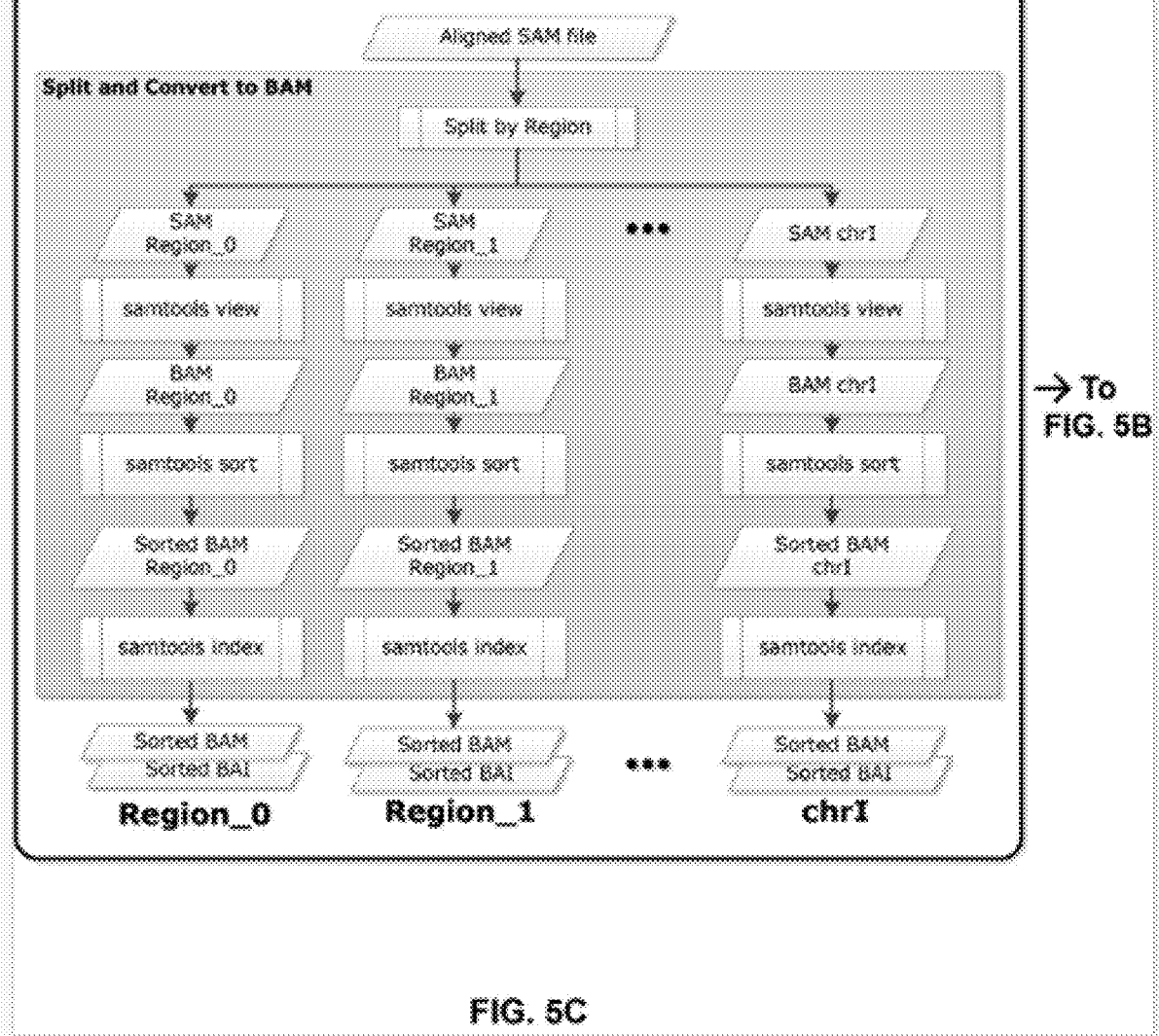
Figure 5D:
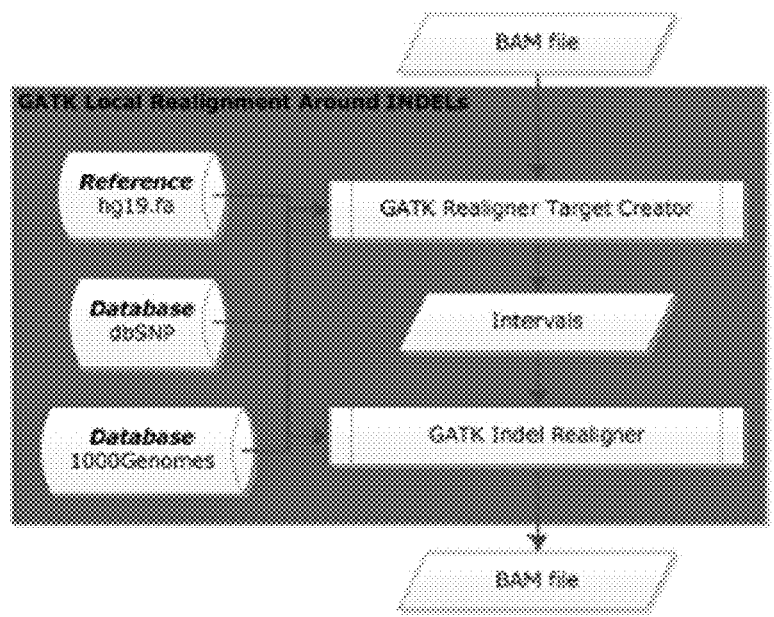
Figure 5E:
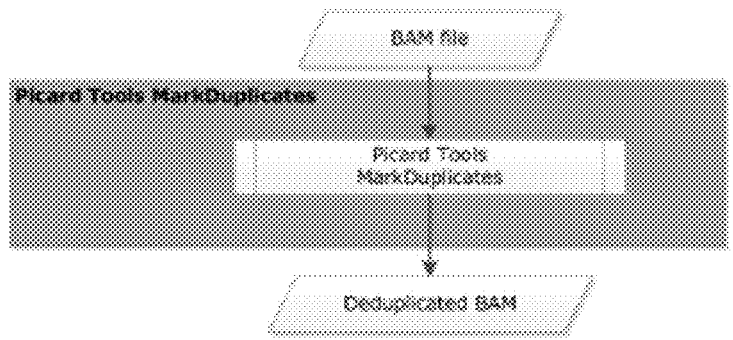
Figure 5F:
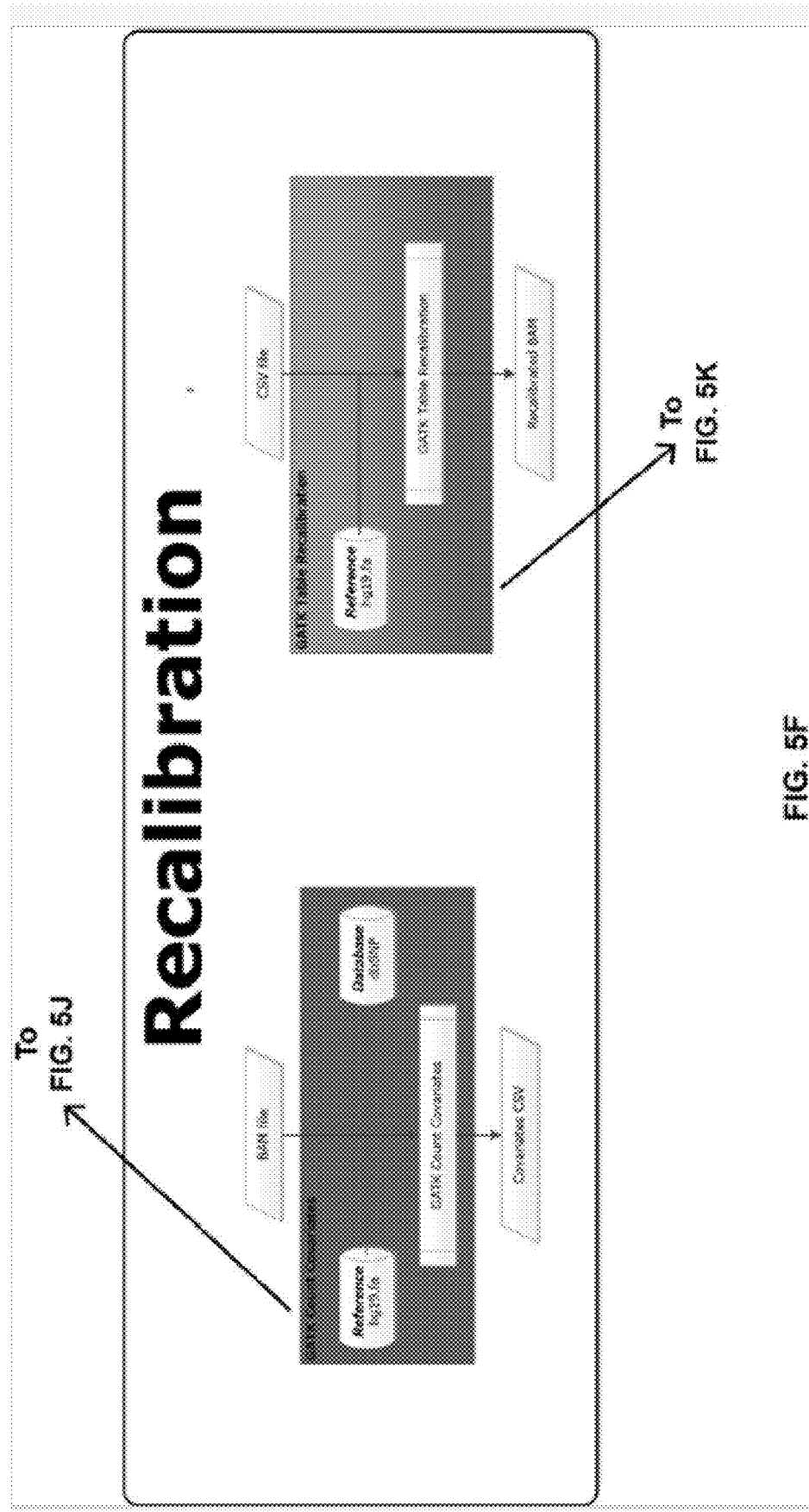
Figure 5G:
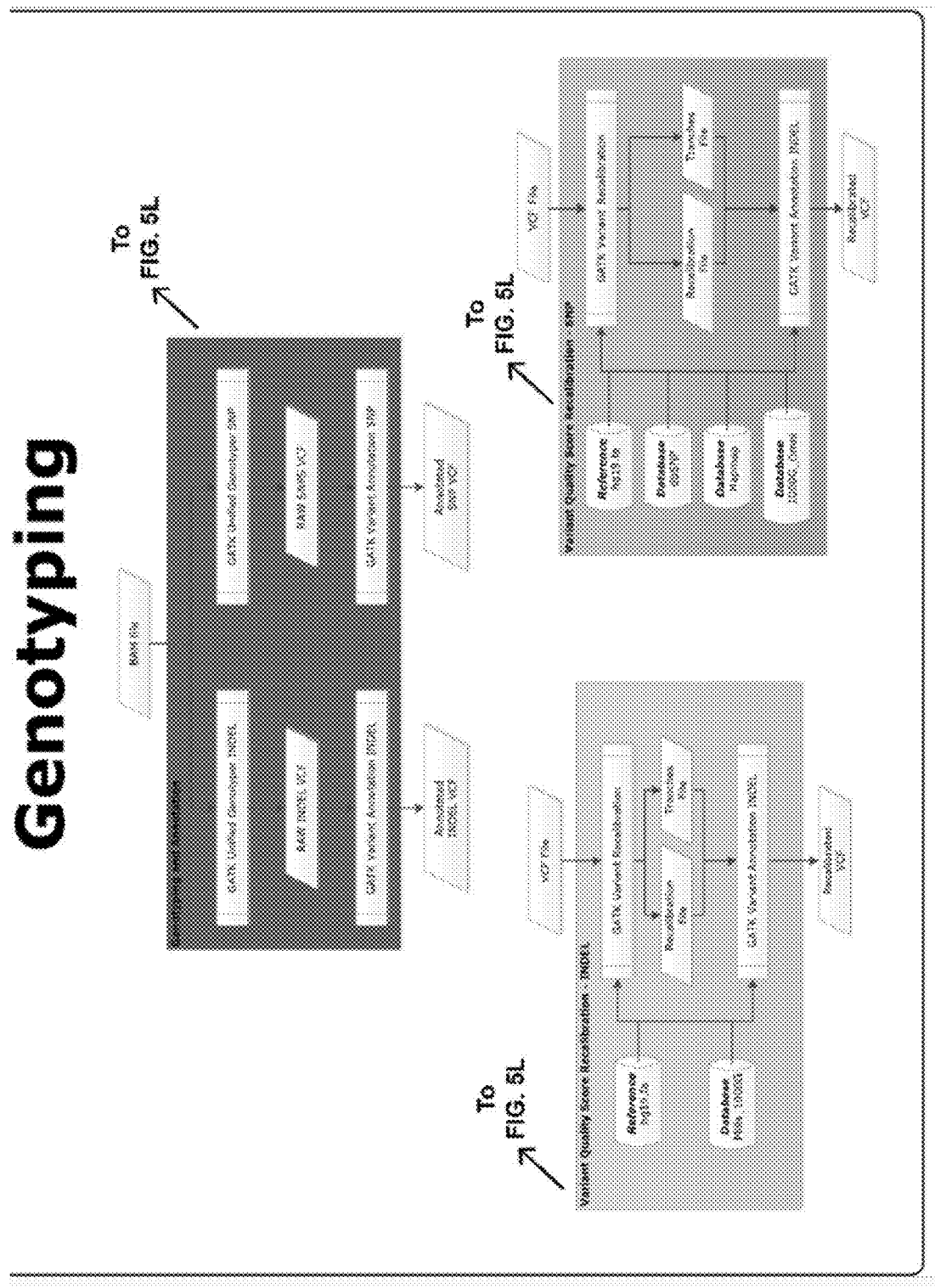
Figure 5H:
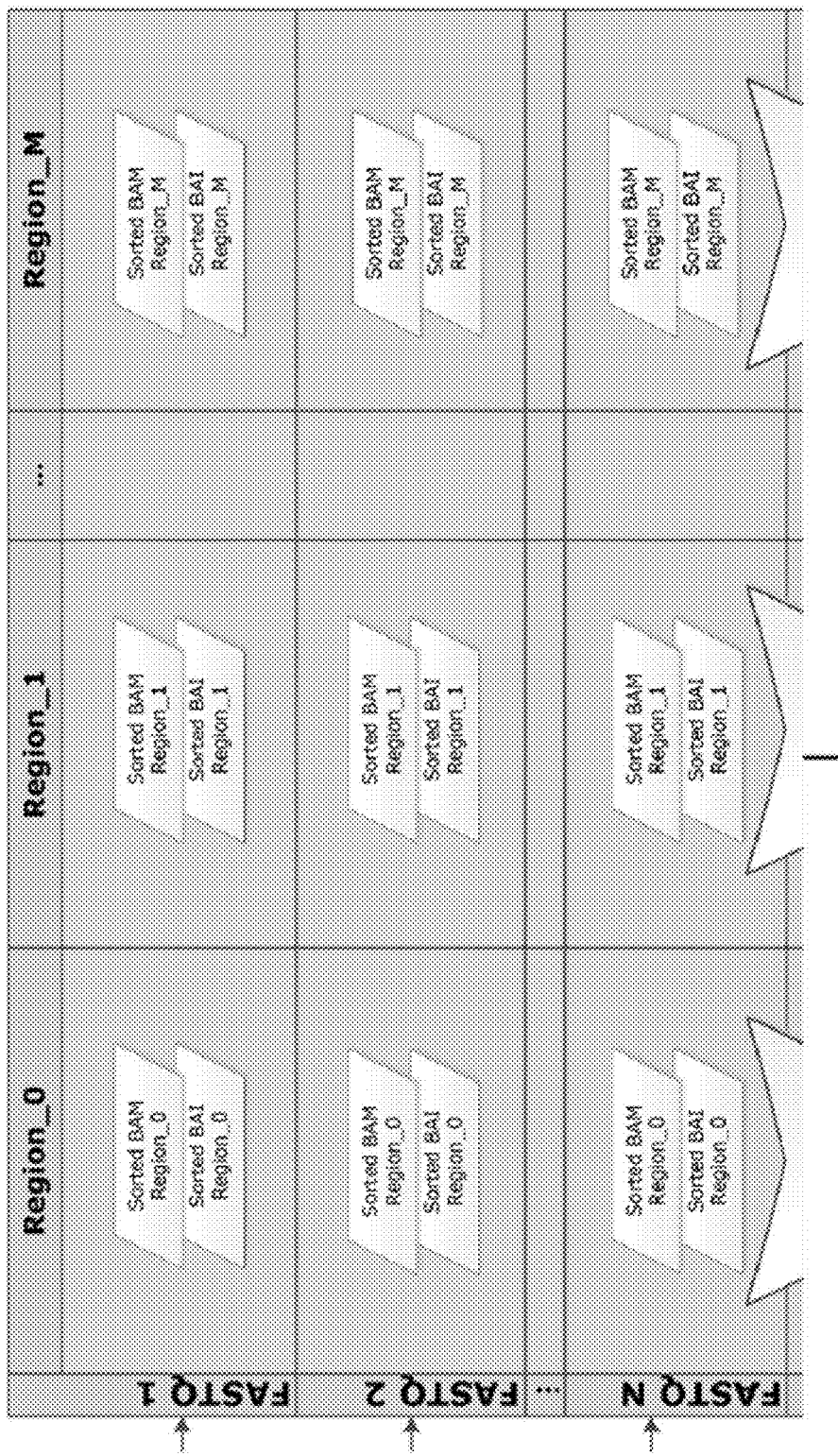
Figure 5I:
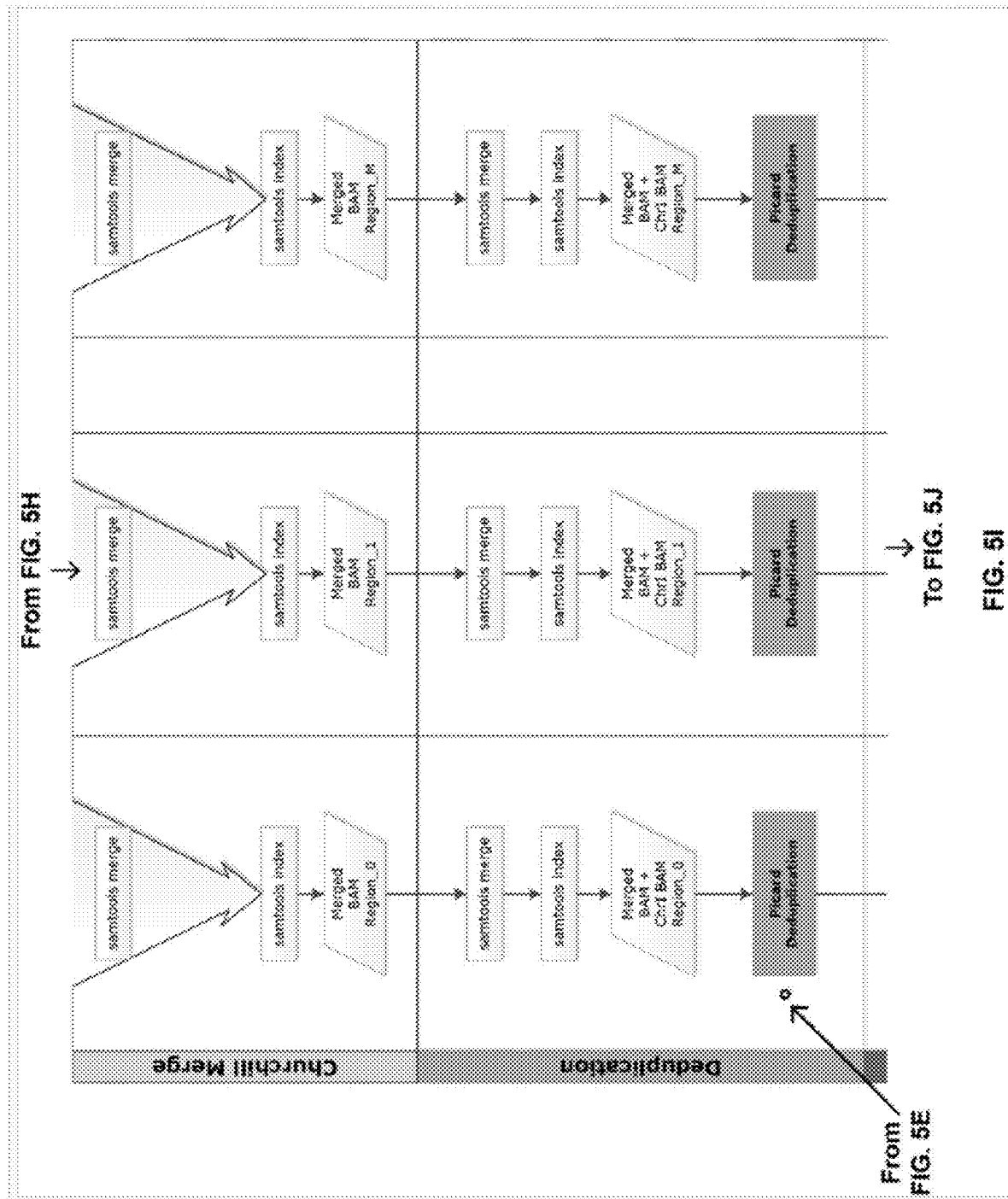
Figure 5J:
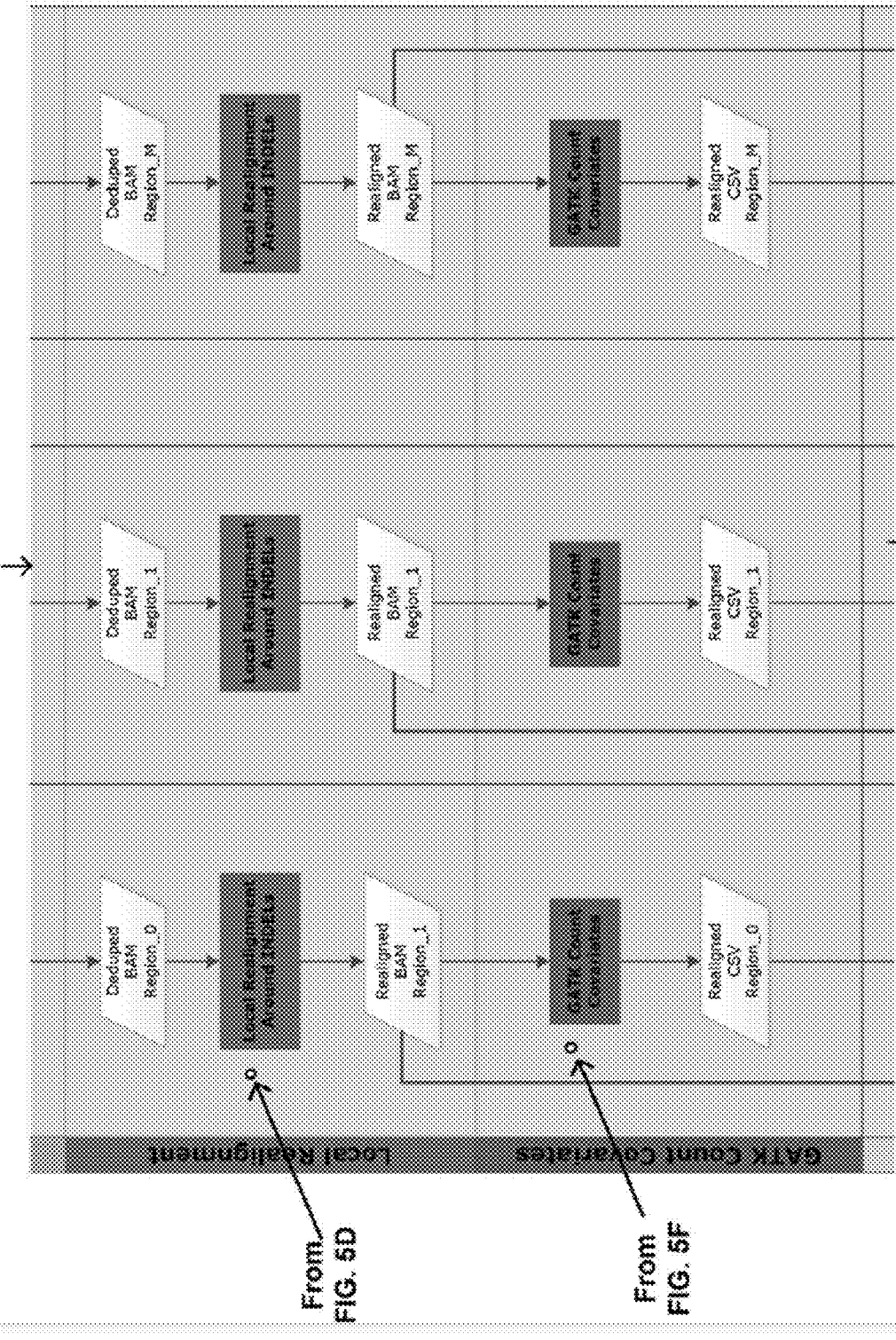
Figure 5K:
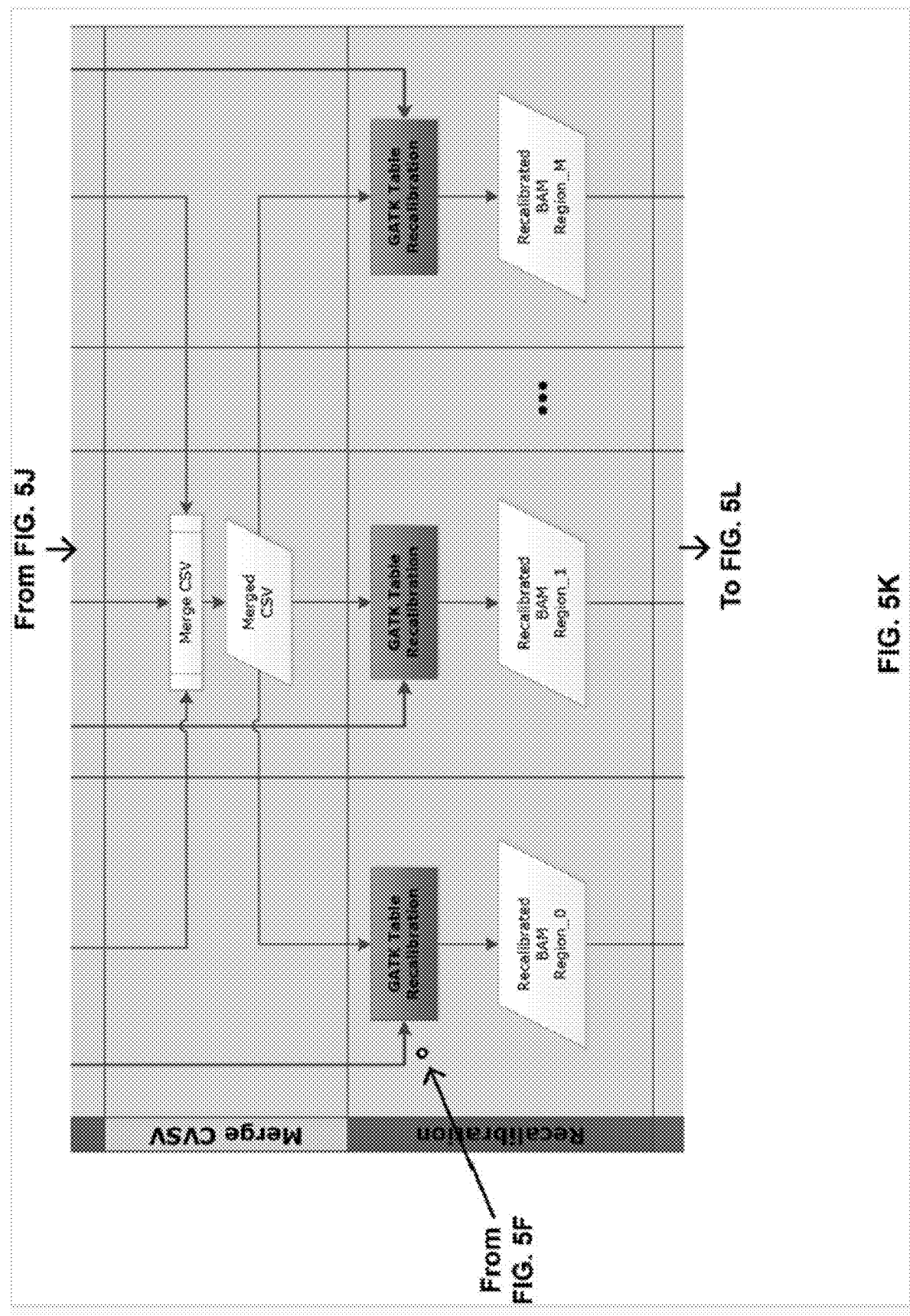
Figure 5L:
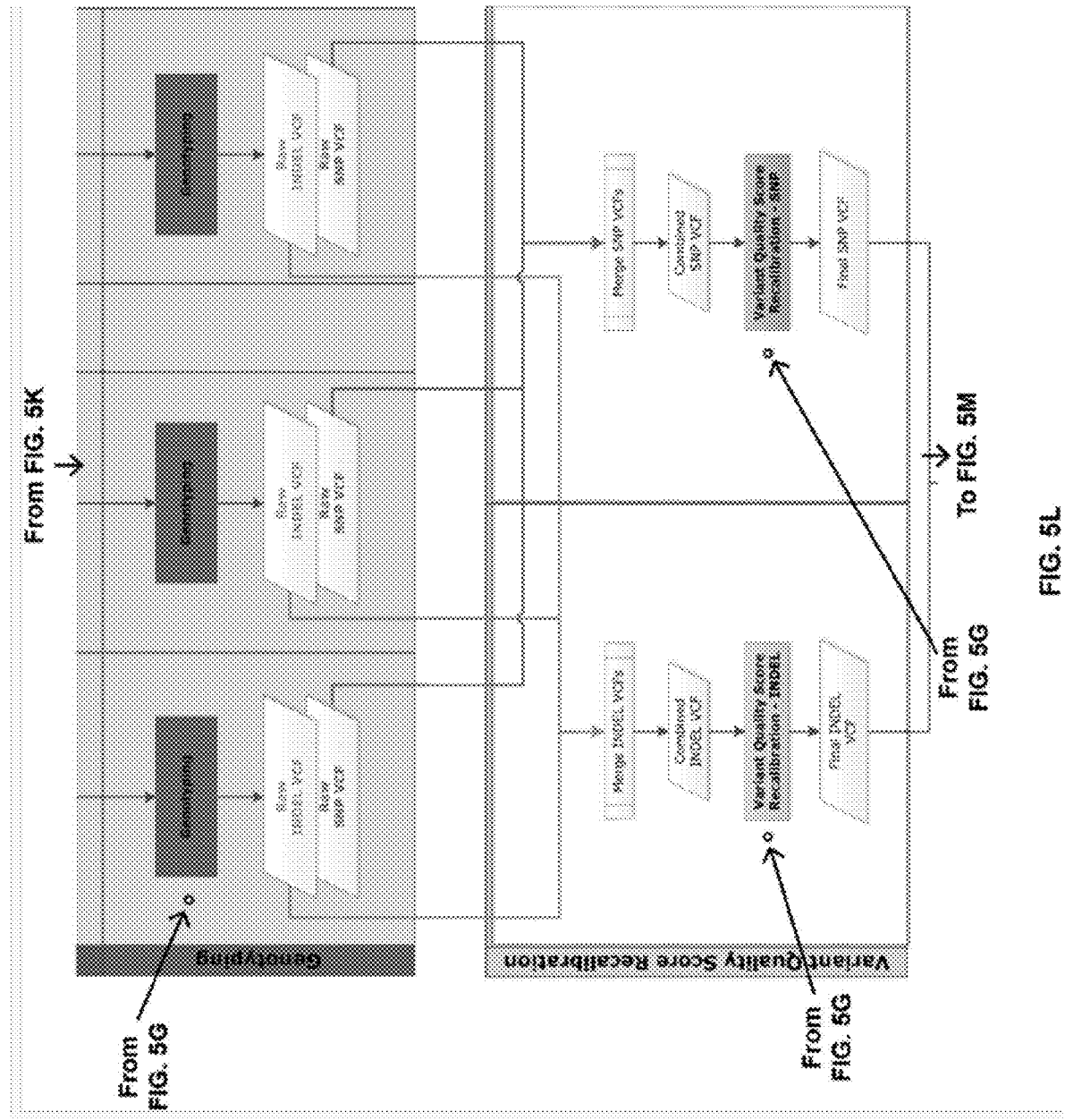
Figure 5M:
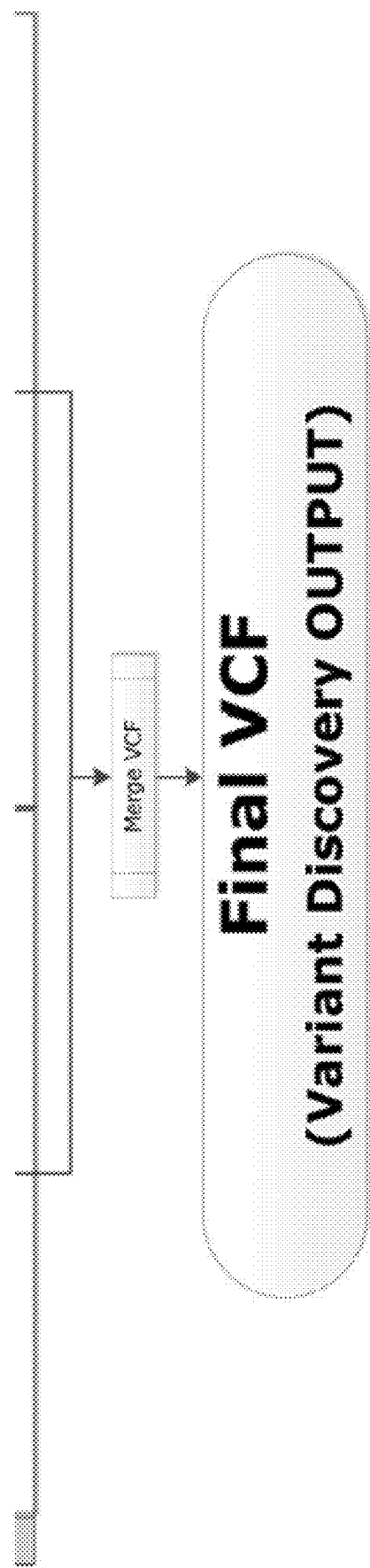

Embodiments disclosed herein are directed to a genomic processing system (and methods thereof) for scalable analysis of genome sequence data, and more particularly, for a deterministic balanced parallelization approach that can enable division of an analytical process of taking raw sequence data through the complex and computationally intensive process of alignment, post-alignment processing and genotyping, ultimately producing a variant list ready for clinical interpretation and tertiary analysis, across many genomic regions with fixed boundaries (subregions). The genomic processing system can split the genome of interest into equally sized genomic subregions (also referred to as "segments") (FIG. 2) and uses both an artificial chromosome (where interchromosomal or boundary-spanning read pairs are processed), and overlapping subregional boundaries, that together maintain data integrity and enable significant performance improvements (FIGS. 3-4).

Each of the processing steps involved in genomic analysis (see FIG. 1) were examined and approaches for parallelized processing were identified. Alignment of individual reads to a reference genome is considered to be an embarrassingly parallel process as the 1 billion raw reads that are generated in sequencing a human genome can in theory be mapped to the reference genome independently of one another; one constraint for paired-end reads is that both reads in a pair should be correctly oriented within proper distance. The remaining steps in the analysis workflow are not embarrassingly parallel by nature and, as such, parallelization approaches of the genomic processing system were developed. One approach to enable a level of parallelization of the subsequent steps is to divide the analysis by individual chromosomes (22 autosomes (chromosomes 1 to 22) and two sex chromosomes (chromosomes X and Y)). Doing so, however, results in a significant load imbalance as the size of these chromosomes varies significantly, with chromosome 1 being-5 times larger than chromosome 21 (FIG. 2A). In addition, limiting parallelization at the chromosomal level restricts the use of processors to a total of 24, such that use of more than 24 CPU cores does not improve performance.

To overcome this limitation of parallelization by chromosome, the human genome can be evenly subdivided (or substantially evenly subdivided) into multiple regions with fixed boundaries (subregions), enabling a load balanced and independent execution of the local realignment, deduplication, recalibration and genotyping steps (FIG. 2B). Some issues that can arise with this strategy include:

1. Dependencies: There are several points at which the results of processes run on individual segments of the genome are not independent. First, duplicate read removal uses the set of reads in sorted order so that any number of read pairs that have identical mappings can be reduced to a single pair. If one were to separate the data, read pairs are kept together. A second point at which different segments depend on each other is duringbase quality score recalibration. Best practices suggest that a true baseline of base qualities uses examination of covariates across the entire sample.
2. Parallelization: Assuming these dependencies have been addressed, the issue then becomes how to parallelize these independent processes. One drawback of the computational techniques in genome resequencing and variant calling is the large memory requirements. Therefore, there may not be enough memory available to process as many segments as cores are available on the server. Also, load balancing is a concern.
3. Determinism: Ideally, introduction of a parallelization strategy should not produce different results depending on how the parallelization was implemented. If determinism is not maintained, then different results can occur based on the available resources at the time of analysis, creating an unacceptable situation for clinical or forensic applications in which reproducibility and determinism are desirable.

4. Interchromosomal reads: Most read pair distances will be normally distributed around a given insert size, which can vary between sequencing runs. Inherently, there will be outliers. These outliers can be either sequencing artifacts or improper mappings. In many cases, however, read pairs with large insert sizes and those with each read of the pair on different chromosomes could indicate a structural variant and as such it is important they are not disregarded. Shortcuts taken on the above described dependencies could result in lost information regarding interchromosomal reads.

In theory, the extremely large size of the human genome (~3 billion base pairs) enables achievement of near-embarrassingly parallel execution of these steps. For example, dividing the genome into 3,000,000 base pair chromosomal subregions would enable execution of these steps in 1,000 parallel processes. In some embodiments, the number of subregions defined can be specified by the user, although increasing this variable to twice the number of cores available for processing leads to improved load balancing. To ensure proper processing of regional boundaries, at both ends of each region, an overlap of the adjacent region is included. This overlap acts as a "buffer zone" to ensure appropriate detection of variants near or spanning region boundaries, as is possible in the case of insertions and deletions (indels). In some embodiments, the resulting region and overlap boundary information can be saved in an intervals file format. The size of this buffer zone can be varied, depending upon the insert size of the initial sequencing library. For example, with a standard fragment size of 500 bp, a 3,000 bp buffer zone can be used. To ensure data integrity at boundary edges, with each subsequent step in the analysis process this boundary zone can be decreased. For example, following deduplication a buffer zone of 3,000 bp can be used for local realignment, a buffer zone of 2,000 bp can be used for base quality score recalibration and a buffer zone of 1,000 bp can be used for variant calling and genotyping (FIG. 4).

In some embodiments, the post-alignment steps of the analysis process (local realignment, duplicate read removal, base quality score recalibration, genotyping and variant quality score recalibration) are performed on these subregions after significant refinement of one or more steps to achieve high levels of parallelization without sacrificing data integrity and quality. In such embodiments, the six steps of the workflow and the optimization that was performed are detailed below. Although disclosed herein in an exemplary order, it is understood that these steps can be performed in any suitable order, in parallel, in series, and/or the like.

Step 1. Parallelized alignment to a reference sequence (e.g., by the assignment module 122). For the initial alignment step, a Burrows-Wheeler Aligner (BWA) can be used to perform reference genome alignment with the reads contained in paired FASTQ files (or any other method appropriate for alignment a sequence read to a reference genome). The speed of the process can be increased through use of inbuilt multithreading capabilities of the alignment method by executing the aligner in multithreading mode (for example, using the bwa aln -t option to specify the number of threads). However, implementation of alignment within this current pipeline uses an approach whereby the total raw input sequencing data (typically 400-800 million paired reads) can be split into multiple smaller FASTQ files and aligned using multiple single-threaded parallel instances of the alignment method. The number of paired-end FASTQ files generated during the sequencing run can be controlled by, for example, the --fastq-cluster-count parameter of Illumina's BCL-conversion process, which specifies the maximum number of reads per output FASTQ file. In some embodiments, the default value of 4,000,000 works well, however, decreasing the number of reads per FASTQ to 1,000,000 can result in increased alignment speed due to better load balancing.

Step 2. Parallelized generation (e.g., by the parallelization module 128) and deduplication of subregional BAMs (e.g., by the segment processing modules 124a-124n). This step includes converting the raw BAM files produced during alignment into subregions, enabling the parallel implementation of the subsequent analysis steps (FIG. 3A). In some embodiments, this approach can include 5 steps:

1. Split raw BAM by region. The genome is split into M chromosomal subregions, where the value of M is defined by the desired level of parallelization. Use of the parallelized alignment approach generates N raw BAM files (also referred to as "subsequences") (derived from alignment of N pairs of input FASTQ files to the entire genome). These BAM files are split according to the coordinates of the subregions, yielding M×N split BAM files. Read pairs in which mates map to different subregions are temporarily transferred to separate split BAM files, one for each of the N input BAM files, identified as chrI.bam ("I" is short for interchromosomal or intersubregional mapping). For example, an expected insert size (e.g., 500 bp) can be set and if a read pair is greater than the expected insert size or maps to a different chromosome, it can be moved to chrI. In this manner, both interchromosomal and intersubregional reads can be identified substantially simultaneously.

2. Merge split BAMs by subregion. For each of the genomic subregions, the N split BAM files associated with a given subregion can be merged into M subregional BAM files, each containing the read pairs mapped within the boundaries of that subregion.

3. Merge split chrI BAMs. The N chrI BAM files can be merged into a single genome-wide interchromosomal BAM file.

4. Parallelized deduplication. Duplicate reads can be identified and removed from region and interchromosomal BAM files. Reads containing amplification errors may be represented in artificially high numbers and, as such, failure to remove these reads from the data set can have a significant negative effect on the final result by introducing variants that reflect these errors rather than true biological polymorphisms. The deduplication process identifies read pairs with identical external coordinates and subsequently reduces the data set to include one copy of the duplicate sequence with highest mapping quality. In some embodiments, Picard Tools MarkDuplicates can be used to identify duplicate reads both within and between chromosomes. In some embodiments, the deduplication process can be performed using a single BAM file, containing the reads from the sequencing run. This approach is used by the GATK-Queue analysis pipeline. However, in addition to this prolonged serial deduplication, the process of merging the BAM files into a single file cannot be parallelized. These processes result in lengthy single-threaded computations that substantially increase analysis run time. The parallelization methods of the genomic processing system overcome this significant limitation by keeping interchromosomal reads together initially and deduplicating them (using tools such as Picard Tools MarkDuplicates) or to reduce I/O, passed directly into a streaming deduplication tool such as sambamba or samblaster). This step can be performed before the individual reads in the pair are merged by coordinates into the appropriate subregional BAMs. This approach can ensure proper deduplication of these interchromosomal reads and can enable safe parallelization of the remainder of the deduplication process across both chromosomes and chromosomal subregions. In this way it is possible to achieve high levels of parallelization of the duplicate marking and removal process without compromising data integrity. The deduplicated BAM is indistinguishable from the results obtained from the lengthy process of post-alignment processing of a single merged genome-wide BAM file. Merge chrl reads with subregional BAMs. The deduplicated interchromosomal paired reads are split according to subregion, and the individual reads are merged back into the appropriate subregion BAM according to the read coordinates. The resulting alignment files contain both appropriately deduplicated interchromosomal and regular reads.

The final output of this step is multiple BAM files, one for each genomic subregion, which include appropriately mapped and deduplicated reads, thereby enabling parallelization of the subsequent steps.

Step 3. Parallelized local realignment around indels. In this processing step, local read realignment is performed to correct for potential alignment errors around indels. Mapping of reads around the edges of indels can result in misaligned bases creating false positive SNP calls. Local realignment uses these mismatching bases to determine if a site should be realigned, and can, for example, apply a computationally intensive Smith-Waterman method to determine the most consistent placement of the reads with respect to the indel and remove misalignment artifacts). One advantage of parallelizing local realignment is that the reads from a given sample can be used to perform the local realignment, ensuring improved accuracy and improving indel detection. Moreover, applying sample-level local realignment across subregions results in significant improvements in processing speed, resulting in reduced analysis costs and faster data analysis.

Step 4. Parallelization of base quality score recalibration. Each base of each read has an associated quality score, corresponding to the probability of a sequencing error. The reported quality scores are known to be inaccurate and as such must be recalibrated prior to genotyping, where they are used in a Bayesian genotype likelihood model employed by, for example, GATK's UnifiedGenotyper). After recalibration, the recalibrated quality scores in the output BAM more closely correspond to the probability of a sequencing error. Moreover, the recalibration tool can correct for variation in quality with respect to machine cycle and sequence context, thus producing both more accurate and widely dispersed quality scores. The genomic processing system can be compatible with GATK's base quality score recalibration (BQSR) method, which analyzes covariation among several features of a base including the reported quality score, the position within the read and the preceding and current nucleotide (sequencing chemistry effect). These covariates are then applied through a piecewise tabular correction to recalibrate the quality scores of the reads in a given BAM file. However, the GATK BQSR method is a source of non-determinism in the analysis pipeline and while compatible with the system, can lead to analysis results that are no reproducible. Accordingly, in some embodiments, the genomic processing system can include a BQSR method that produces deterministic recalibration results and improves upon some known methods for recalibration by gathering recalibration data from bases having an exact matching set of covariates to the base being recalibrated rather than from adjusting the base quality for each covariate individually. In such aspects, to ensure integrity of the recalibration process, BQSR counts the possible covariate combinations to calculate the recalibration matrix and merges the covariate results for each subregion so that each parallel recalibration instance has input data from the entire genome rather than just its region. In some instances, GATK BQSR uses a pool of covariates from across the genome for proper calculation, the benefit of the BQSR approach of the genomic processing system is that it enables the genomic processing system to use the entire dataset for recalibration purposes, improving accuracy and avoiding downsampling, which can lead to non-determinism.

Step 5. Parallelization of variant calling. In this step, variant calls can be generated from the analysis ready reads generated during recalibration with multiple variant calling methods, including but not limited to, GATK UnifiedGenotyper, GATK HaplotypeCaller, and/or Freebayes. These methods can be implemented on both single sample data and multi-sample data, where variant information from the samples in a given experiment is utilized to improve genotyping accuracy. Due to the overlapping buffer zones at the ends of each region, it is possible that a variant occurring in one of these zones may be called twice: once in the region to which it belongs and once in the overlap zone of the adjacent region (see FIG. 4). This can be corrected by assigning the variant to the appropriate subregion and removing its buffer-zone duplicate from the final merged raw variants file. This determination can be made based on the location of the variant call and its position relative to the fixed subregion boundaries. The raw genotype calls from each subregion are concatenated into genome-wide VCF files for both SNPs and indels ready for down-stream analysis and interpretation.

The method to generate and deduplicate subregional BAMS described in Step 2 above can be significant for parallelization of the analysis workflow, and in combination with use of overlapping boundary regions, can overcome the requirement for merging of the data during subsequent steps. There can be multiple approaches to achieve this, some non-limiting examples of which are provided below:

Example Strategy One (e.g., see FIG. 3B):
1. Split raw BAM by region. As described above.
2. Merge split BAMs by subregion. As described above.
3. Merge split chrl BAMs and deduplicate. The N chrl BAM files can be merged into a single genome-wide interchromosomal BAM file, which then undergoes deduplication (using tools such as Picard Tools MarkDuplicates).
4. Merge chrl reads with subregional BAMs. The deduplicated interchromosomal paired reads are split according to subregion, and the individual reads are merged back into the appropriate subregion BAM according to the read coordinates.
5. Parallelized deduplication. Duplicate reads are identified and removed from subregion BAM files, containing the additional reads from the deduplicated interchromosomal BAM files. The resulting alignment files contain both appropriately deduplicated interchromosomal and regular reads.

Example Strategy Two (e.g., see FIG. 3C):

1. Split raw BAM by region. The genome is split into M chromosomal subregions, where the value of M is defined by the desired level of parallelization. Use of the parallelized alignment approach generates N raw BAM files (derived from alignment of N pairs of input FASTQ files to the entire genome). These BAM files are split according to the coordinates of the subregions, yielding M×N split BAM files. Unlike the previously described strategies, read pairs in which mates map to different subregions are NOT transferred to chr1 BAM. If the reads in a pair map to different subregions, both reads in the pair are transferred to both of the resulting subregional BAM files (e.g. chr1 read pairs). This temporarily results in reads being duplicated in both the subregion of the first read in the pair and in the subregion of the second read in the pair. These reads can also be substantially simultaneously written to a BAM containing interchromosomal reads for detection of structural variants and alternative analysis approaches.
2. Merge split BAMs by subregion and deduplicate in parallel. For each of the genomic subregions, the N split BAM files corresponding to a given subregion are merged into M subregional BAM files, each containing the read pairs mapped within the boundaries of that subregion. The resulting subregional BAM files are then sorted and indexed, the output of which can either be written to disk for subsequent deduplication (using tools such as Picard Tools MarkDuplicates) or to reduce I/O, passed directly into a streaming deduplication tool such as, for example, sambamba or samblaster. As read pairs in different subregions are kept together, the resulting alignment files contain both appropriately deduplicated interchromosomal and regular reads.
3. Pruning of subregional BAMs. For the subsequent processing steps, the subregion overlap region is trimmed by 1000 bp prior to or during local realignment. This results in removal of the reads outside of the new subregional boundary, thus removing the temporarily duplicated reads defined during the initial splitting step, and thereby ensuring integrity of the data in the subsequent realignment, recalibration, variant calling and genotyping steps.

The output of the genomic processing system from any of these parallelization strategies is multiple BAM files, one for each genomic subregion, which include appropriately mapped and deduplicated reads, thereby enabling parallelization of the subsequent steps. These exemplary strategies both have the advantage of defining a barn file with interchromosomal reads, which can be used for subsequent detection of genomic structural rearrangements. Exemplary strategy two has the advantage of further simplifying the deduplication process, and in combination with tools that can read in streaming BAM output within memory, would result in further reduced run times and increased performance, such as, for example, reduced CPU time and/or increased CPU utilization.

An example representation of a process (e.g., the method 200) of the genomic processing system (e.g., of the system 100) as disclosed herein is illustrated in FIGS. 5A-5M. Compared with alternative analysis pipelines, the process of FIGS. 5A-5M is simpler, faster, and more widely applicable to various shared memory/distributed High Performance Computing clusters. The process of FIGS. 5A-5M can be implemented by the genomic processing system, for example, as a mixture of Bash and Python scripts, linking and preparing for parallelization the inputs and outputs of, for example, BWA, Picard, SAMTools, and/or GATK. The process of FIGS. 5A-5M begins by creating the scripts required to run the pipeline and then proceeds to execute (or submit to the job scheduler) the scripts in the desired parallelization method (shared memory, GNU make, Sun Grid Engine (SGE), or Portable Batch System (PBS)) specified by the user. The process of FIGS. 5A-5M can be executed by the genomic processing system in multiple environments for distributed computing, including, but not limited to, a shared memory machine or server with explicit task creation, a shared memory machine or server with task creation by GNU Make, and HPC clusters and cloud implementations that support distributed Make, such as, for example, PBS and SGE. (Table 1). As such, the process of FIGS. 5A-5M is compatible with a wide range of Linux systems including high-performance workstations, small single servers, moderate in-house clusters with shared or non-shared memory servers, large HPC systems housed at supercomputing centers and in the cloud.

Test Data and Validation

To test the process of FIGS. 5A-5M, Illumina HiSeq 2000 100 bp paired-end whole genome sequencing data sets with 30× average coverage were used, which can be encompassed by the genomic processing system. Additional validation was performed using FASTQ files from the Sequence Read Archive Study ERP001229 for whole human genome sequencing of the 1000 Genomes CEU female NA12878 (Illumina HiSeq 2000 paired-end 100 bp reads, split into 431 pairs of FASTQ files, each containing 2,000,000 reads). The VCF files produced from this data, GATK-Queue and HugeSeq were compared to NIST benchmark SNP and indel genotype calls generated by the Genome in a Bottle (GIAB) Consortium. First, VCFs were filtered to remove low quality variant calls as indicated by a "LowQual" flag generated by the given pipeline. Second, the VCF was filtered to the GIAB callable regions using the vcflib tool vcfintersect with the BED file provided by GIAB. Third, complex variants were decomposed into a canonical SNP and indel representation using the vcflib tool vcfallelicprimitives. Finally, VCF files were converted to tables and compared to the GIAB validation dataset (version 2.18) using custom scripts in R.

Profiling and Benchmarking

In addition to measuring the running time, the CPU utilization profile was recorded using the collectl utility, a comprehensive tool to measure the performance of a linux system. CPU, memory, disk, and network usage were measured at IO-second intervals. The output was then parsed and plotted using scripts customized for this purpose.

Analysis with the Bcbio-Nextgen Pipeline

The bcbio-nextgen run was performed using version 0.7.9 of the software that was installed using the provided installer script (bcbio_nextgen_install.py). After installation, the GATK software was upgraded using the provided upgrade script (bcbio_nextgen.py upgrade) to version 3.2-2 so that GATK's HaplotypeCaller could be used. The run was performed on a single r3.8× large AWS EC2 instance. The run requested 32 cores to be used (−n 32) since 32 cores were available on the r3.8× large instance. This resulted in BWA-MEM being assigned 16 cores (−t 16) and sambamba being assigned 16 cores (−t 16).

Processing of 1000 Genomes Data

To process each sample, the input FASTQ files for the sample were first copied from the IOOOgenomes S3 bucket to local storage on an EC2 instance. These input files were then processed by the pipeline of the genomic processing system to produce a set of realigned & recalibrated BAM files, one for each region. Finally GATK's UnifiedGenotyper was run over the realigned & recalibrated BAM files from each sample to produce a single multi-sample VCF. A hard filtering strategy was employed similar to that used by the 1000 Genomes group original analysis of this data.). The single multi-sample VCF was filtered to remove indels with DP<2566, DP>16320, InbreedingCoeff<−0.8, QD<1.5, or FS>200. SNPs were removed with DP<2566, DP>16320, QD<1.5, MQ<30, FS>80, or HaplotypeScore>13.

Results

The genomic processing system executing the process of FIGS. 5A-5M automates the analytical process used to take raw sequence data through the complex and computationally intensive process of alignment, post-alignment processing and genotyping, ultimately (in some embodiments) producing a variant list ready for clinical interpretation and tertiary analysis (FIGS. 3-5). Each of these steps was improved to significantly reduce analysis time, without downsampling and without making any sacrifices to data integrity or quality. The parallelization strategy of the genomic processing system includes a deterministic parallelization method that enables division of the workflow across many genomic regions with fixed boundaries (subregions) (FIG. 2). This division of work, if naively implemented, would have major drawbacks: read pairs spanning subregional boundaries would be separated leading to incomplete deduplication and variants on boundary edges would be lost. To overcome this challenge, the genomic processing system uses both an artificial chromosome, where interchromosomal or boundary-spanning read pairs are processed, and overlapping subregional boundaries, that together maintain data integrity and enable significant performance improvements (FIG. 3-4).

Performance Comparisons of Parallelization Strategies

Figure 6A:
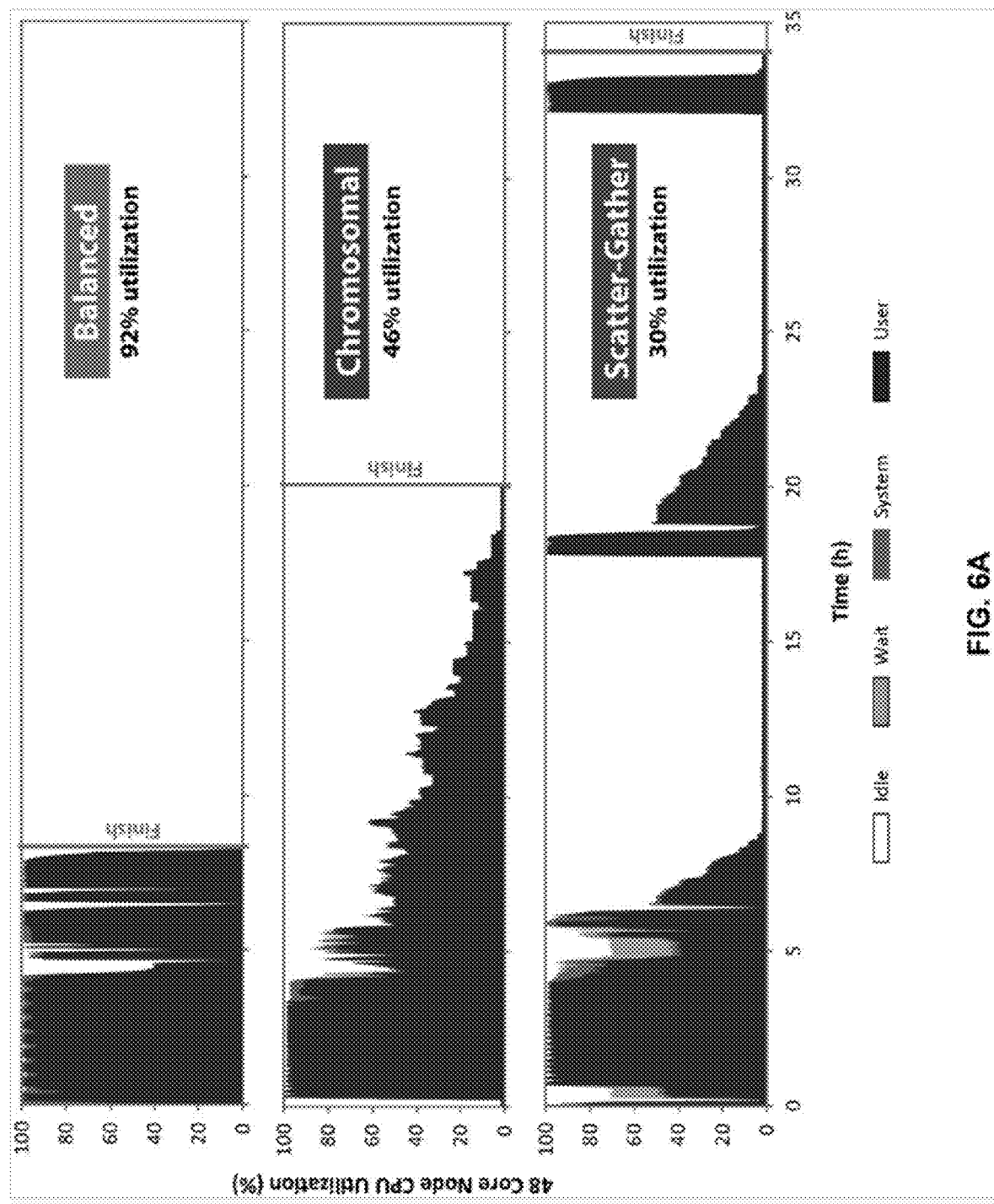

The parallelization approach of the genomic processing system overcomes the limitation of parallelization by chromosome, enabling a load balanced and independent execution of the local realignment, deduplication, recalibration and genotyping steps (FIGS. 6A-6C). The timing of each of these steps decreases in a near-linear manner as the workload is efficiently distributed across increasing compute resources. Using a typical human genome data set, sequenced to a depth of 30x, the performance of the balanced parallelization approach of the genomic processing system was compared with two alternative BWA/GATK based pipelines: GATK-Queue utilizing scatter-gather parallelization and HugeSeq utilizing chromosomal parallelization. The parallelization approach of the genomic processing system enabled highly efficient utilization of system resources (92%), while HugeSeq and GATK-Queue utilize 46% and 30% respectively (FIG. 6A). As a result, using a single 48-core server (Dell R815), the parallelization approach is about 2x faster than HugeSeq, about 4x faster than GATK-Queue, and about 10x faster than a naive serial implementation (FIG. 6B). Furthermore, the parallelization approach of the genomic processing system scales highly efficiently across cores within a single server (FIG. 6C).

Figure 7A:
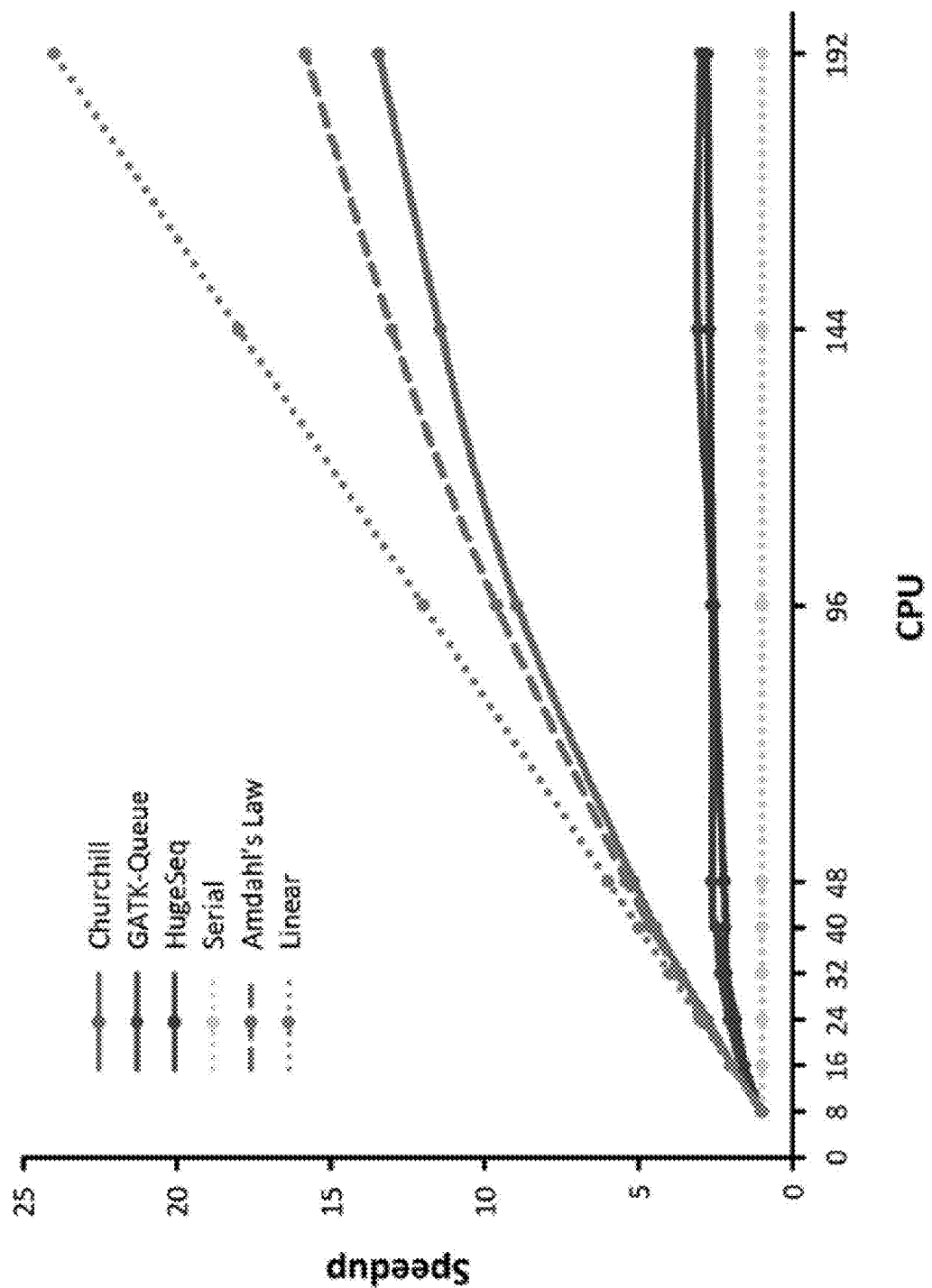
FIGS. 7A-7B-Illustration of efficient scaling enabling secondary analysis achieved in less than two hours. Scaling of analysis beyond a single compute node was evaluated.
Figure 7B:
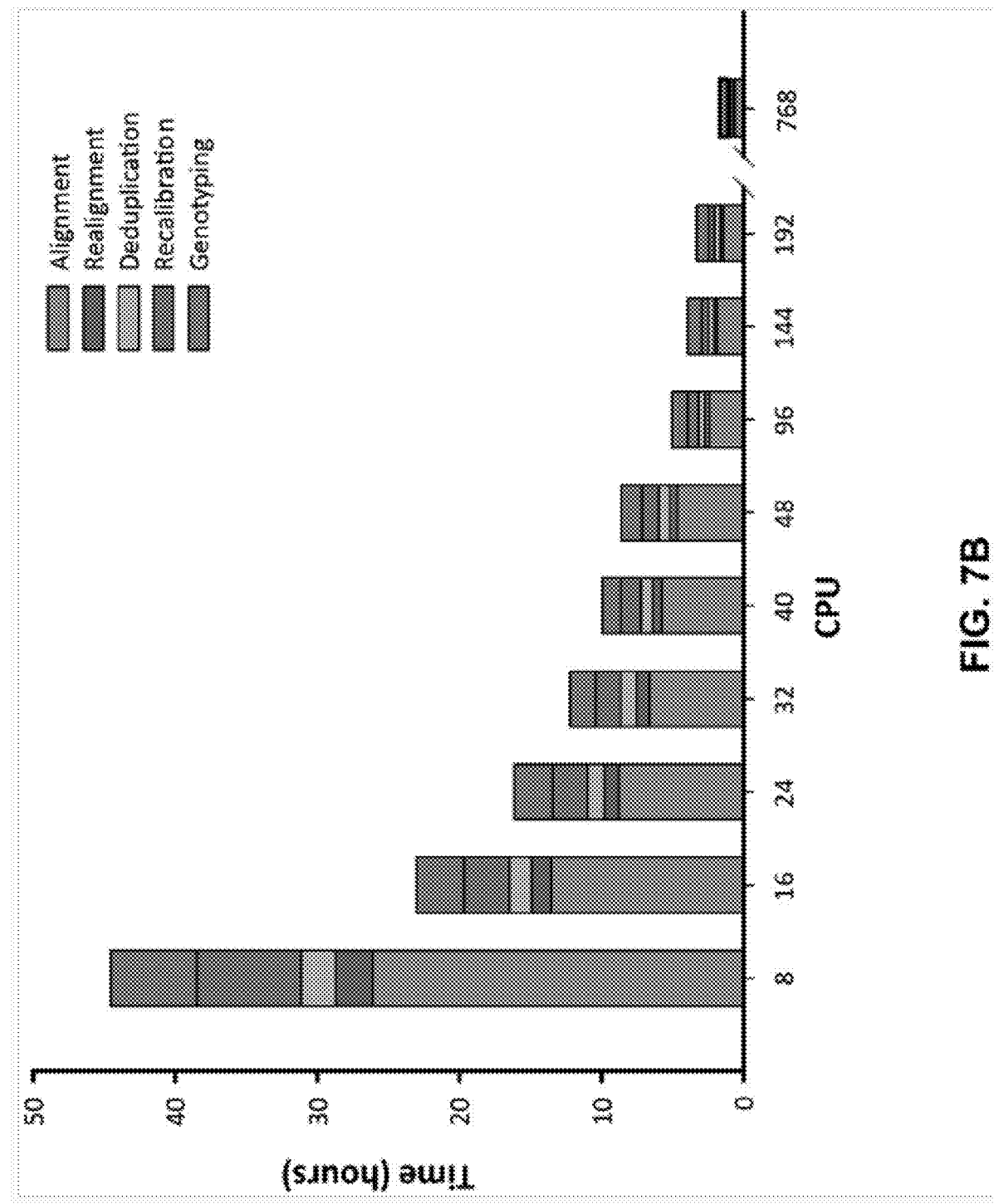

The capability of the parallelization approach of the genomic processing system to scale beyond a single compute node was evaluated (FIG. 7). FIG. 7A shows the scalability of each pipeline across a server cluster with fold speedup plotted as a function of the number of cores used. Scalability of the genomic processing system closely matches that predicted by Amdahl's law, achieving a speedup in excess of 13-fold between 8 and 192 cores. In contrast, both HugeSeq and GATK-Queue showed modest improvements between 8 and 24 cores (2-fold), reaching a maximal 3-fold plateau at 48 cores. The parallelization approach of the genomic processing system enabled resequencing analysis to be completed in three hours using an in-house cluster with 192 cores (FIG. 7B). Simply performing alignment and genotyping (without deduplication, realignment, or recalibration), used twice the number of cores to achieve a similar analysis time using CrossBow. Utilization of the parallelization approach on both the Ohio Supercomputer Center's Glenn Cluster (768 cores over 96 nodes) and on Amazon Web Services (AWS) Elastic Compute Cloud (EC2) (768 cores over 24 CRI instances) enabled analysis completion in less than 1 hour 50 minutes.

Figure 8:
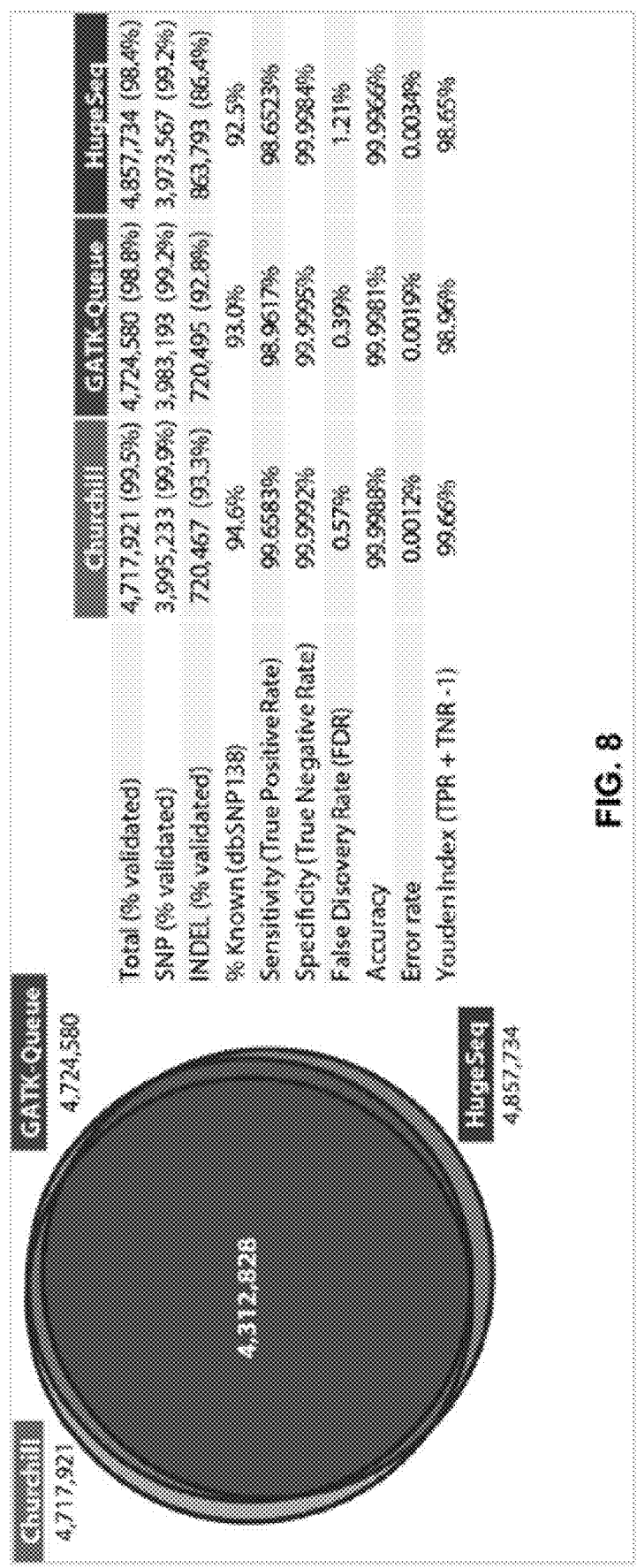
FIG. 8—Illustration of the final VCF output of the genomic processing system ("Churchill"). GATK-Queue and HugeSeq were compared and evaluated against the National Institute of Standards and Technology (NIST) benchmark SNP and indel genotype calls generated by the Genome in a Bottle Consortium (GIAB). The Venn diagram shows a high degree of concordance between the three pipelines. Churchill identified the highest number of validated variants from the ~2.9 million calls in the GIAB dataset, for both SNPs (99.9%) and indels (93.5%), and had the highest overall sensitivity (99.7%) and accuracy (99.9988%). The Youden index (or J statistic), a function of sensitivity (True Positive Rate) and specificity (True Negative Rate), is a commonly used measure of overall diagnostic effectiveness.

The output of the parallelization approach of the genomic processing system was validated using the National Institute of Standards and Technology (NIST) benchmark SNP and indel genotype calls generated by the Genome in a Bottle (GIAB) Consortium. FASTQ files from the 1000 Genomes CEU female NA12878 were analyzed using the parallelization approach of the genomic processing system, GATK-Queue and HugeSeq, each using the GATK UnifiedGenotyper method for variant calling and genotyping, and resulting VCF files were compared (FIG. 8). While there is a high degree of concordance between the three pipelines, the parallelization approach of the genomic processing system produced the highest percentage of validated variant calls, for both SNPs (99.9%) and indels (93.3%), and had the highest overall sensitivity (99.7%) and accuracy (99.9988%). GATK-Queue had slightly higher specificity than the parallelization approach, and the lowest false discovery rate (0.39%), but failed to identify-20,000 validated variants found by the parallelization approach. Of the three pipelines, the parallelization approach of the genomic processing system had the highest diagnostic effectiveness (99.66%), followed by GATK-Queue (98.96%) and HugeSeq (98.65%), as assessed by the Youden Index.

Resource utilization and performance in the cloud.

Figures 9A, 9B:
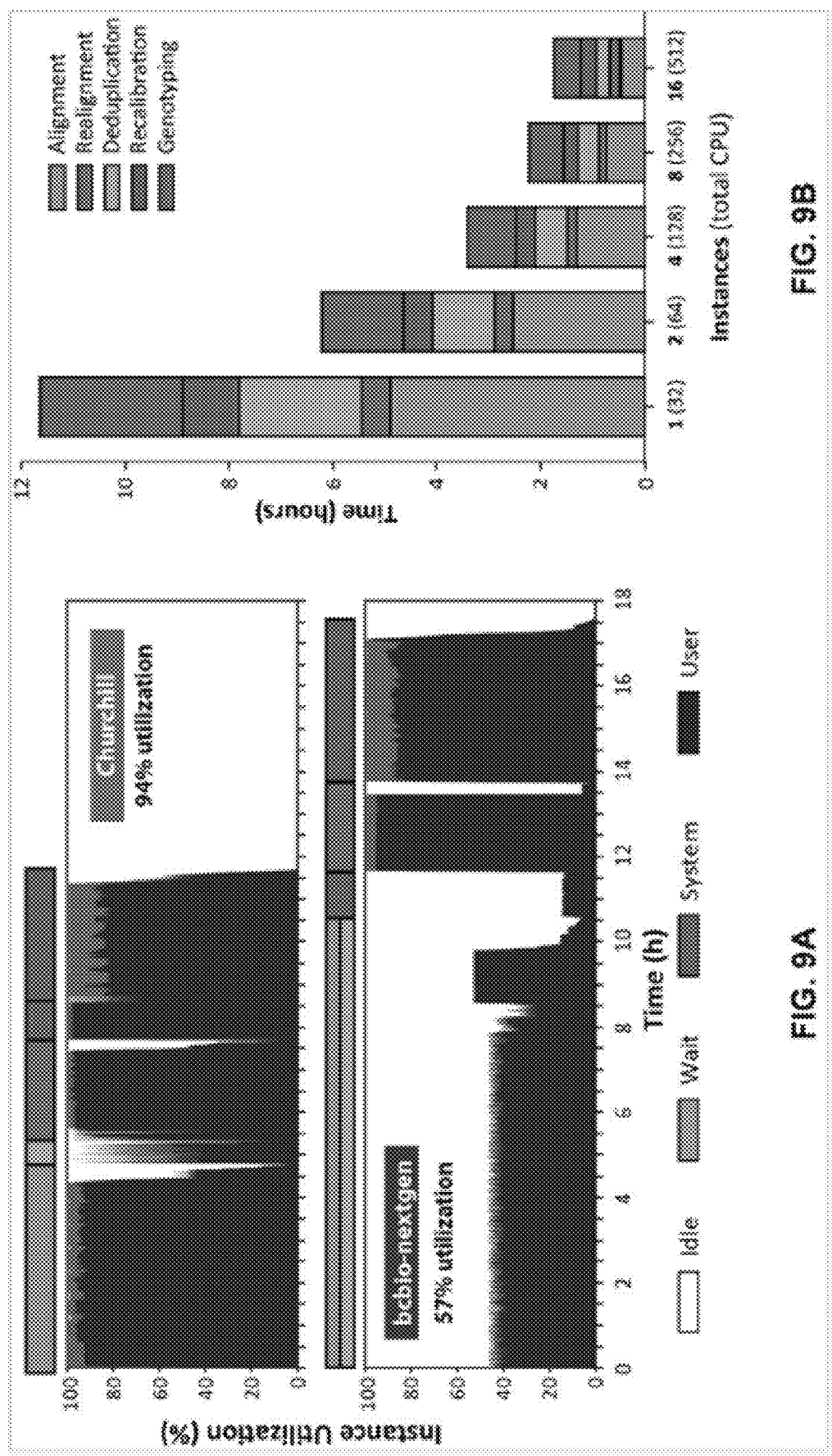
FIGS. 9A-9B-illustration of enabling rapid secondary analysis and variant calling with GATK HaplotypeCaller using cloud computing resources. Analysis of raw sequence data for a single human genome sequence dataset (30× coverage) was compared using the genomic processing system ("Churchill") and bcbio-nextgen, with both pipelines utilizing BWA-MEM for alignment and GATK HaplotypeCaller for variant detection and genotyping.

The capability to perform whole genome variant discovery and genotyping via local re-assembly of haplotypes was assessed using AWS cloud compute resources and the GATK HaplotypeCaller method for variant discovery and genotyping. For comparison purposes, the performance on AWS was compared with bcbio-nextgen, a python toolkit that provides a distributed multi-architecture pipeline that automates variant calling. Both pipelines were setup to utilize BWA-MEM for alignment and GATK HaplotypeCaller for variant detection and genotyping to analyze raw sequence data for a human whole genome sequence dataset (30x coverage). CPU utilization on a single r3.8x large AWS EC2 instance (32 cores) was monitored throughout the analysis run. The results demonstrated that the parallelization approach of the genomic processing system had significantly greater resource utilization (94%) than bcbio-nextgen (57%), enabling the entire analysis to be completed in under 12 hours with a single instance (FIG. 9A). The initial phase of bcbio-nextgen execution uses a shell pipeline of BWA-MEM, samblaster, samtools and sambamba to perform alignment, mark duplicates, convert SAM to BAM, and sort the resulting BAM data. However, during this phase of processing, less than 50% CPU utilization was observed (FIG. 9A).

The genome sequencing system enabled the steps of the analysis process to be efficiently scaled across multiple AWS instances resulting in significantly reduced run times (FIG. 9B). With 16 AWS EC2 instances the entire analysis could be completed in about 104 minutes, with the variant calling and genotyping with GATK HaplotypeCaller stage taking about 24 minutes. In contrast, using the default options of the bcbio-nextgen workflow, alignment and deduplication is parallelized by using the built-in multi-threading capabilities of BWA and sambamba, and as such it is limited in scalability to the number of cores available on a single machine. Next, the bcbio-nextgen software uses sambamba to index the single BAM resulting from the previous phase. Again this processing is limited to a single process that cannot scale beyond a single machine.

Analysis of the 1000 Genomes Project on the Cloud

In order to demonstrate the genomic processing system's utility for population-scale genomic analysis, 1088 low-coverage whole-genome samples from "phase 1" of the 1000 Genomes Project (1 KG) were analyzed, including calling variants with GATK's UnifiedGenotyper on samples substantially simultaneously to generate a multi-sample final VCF. The entire analysis was completed in less than 7 days using 400 AWS EC2 instances (cc2.8× large spot instances) and the total analysis cost was ~$12,000, inclusive of data storage and processing. 41.2M variants were identified, versus IKG's 39.7M (FIG. 10). The two call sets had 34.4M variant sites in common, of which 34.3M had the same minor allele with highly similar frequencies (Pearson's correlation coefficient of 0.9978, p-value<2.2e-16) (FIG. 10C). The results were validated against previously identified variants (dbSNP Build138, excluding those from the 1 KG submission). SNP validation rates were similar, 52.8% (parallelization approach of the genomic processing system) and 52.4% (1 KG). However, due to improvements in indel calling since the original 1 KG analysis, approaches of the genomic processing system called three-fold more indels with a higher rate of validation (19.5% vs. 12.5%). Of the indels unique to parallelization approaches of the genomic processing system, a 7-fold higher rate of validation was observed compared to those unique to 1 KG. Of the GIAB consortium's validated indel dataset, 81.5% were observed, in contrast to 43.9% with the 1 KG analysis. Parallelization approaches of the genomic processing system called-71% of the 99,895 novel validated indels in the GIAB NA12878 dataset (those not found in the 1 KG analysis) with alternative allele frequencies as high as 100% (mean 40.2%).

The parallelization method(s) of the genomic processing system(s) described herein provide a single pipeline for discovery of genetic variation, fully automating alignment, deduplication, local realignment, base quality score recalibration, variant calling and genotyping. By carefully exploring interdependencies among different sub-tasks, high levels of parallelism is achieved and reproducible data analysis is completed in a fraction of the time, without sacrificing data quality or integrity.

Demonstration of Deterministic Analysis Behavior

A parallel program is deterministic if, for a given input, every execution of the program produces identical externally visible output. Therefore, for a parallel pipeline performing whole genome resequencing analysis, these criteria for determinism would be met if, given a set of raw sequence data as input, every execution of the program produces identical variant calls and genotypes as the output. Not only are the results reproducible when executed with the same number of subregions, but analysis is deterministic; regardless of the scale of parallelization the final result is identical, providing an improved solution for multiple applications including, but not limited to, clinical diagnostics and forensics. Other parallelization strategies fail to achieve this level of reproducibility or make sacrifices in data quality for speed. Strikingly, non-determinism can be introduced at virtually every step in the analysis if configuration parameters are not carefully selected. For example, the developers of GATK recognize that results are non-deterministic when using built-in multithreading options and recommend disabling multithreading if absolute determinism is desired at the expense of significantly increased run time. Moreover, GATK's default use of downsampling can also result in differing output. Parallelism as disclosed herein need not utilize GATK multithreading, nor does it perform downsampling by default. Repeatability of results desirable in clinical sequencing applications is provided, and the deterministic behavior removes the potential for inconsistencies in repeat analysis or in larger studies where analysis is performed at multiple locations.

Elimination of Interdependencies Among Analysis Steps while Maintaining a Best-Practice Implementation To efficiently distribute the analysis workflow, the genomic processing system can equally divide the genome into multiple subregions and process each of those segments independently, defining an "embarrassingly parallel" computation (FIGS. 3 and 5). Many inter-process dependencies in the workflow have been removed, including elimination of two merge points in the workflow: before deduplication and before assembly of the covariates table for base quality score recalibration.

Deduplication uses the entire set of reads in sorted order so that any number of read pairs that have identical mappings can be reduced to a single pair). In parallelization of this deduplication process by subregions, mapping information of these read pairs are kept together. Most read pair distances will be normally distributed around a given insert size that fall within the boundaries of a given subregion. Inherently there will be outliers that could represent sequencing artifacts or improper mappings, but in many cases read pairs with large insert sizes and those with mates mapped to different chromosomes provide important information about possible interchromosomal rearrangement (translocations). For example, the Catalogue Of Somatic Mutations In Cancer (COSMIC v70, August 2014) contains over 10,000 gene fusions known to be associated with benign and malignant tumors, many of which have been shown to play key roles in cancer initiation. The clinical relevance of interchromosomal reads is further highlighted by the fact that gene fusions can be linked to clinical outcomes; for example, the presence of the BCR-ABLl fusion is a powerful prognostic indicator in both pediatric and adult leukemias). As such, interchromosomal reads are properly handled during parallel processing by the genomic processing system, and an additional single BAM file containing the interchromosomal reads is defined to aid further analysis for structural variants. The addition of an artificial chromosome strictly for reads spanning subregions (including interchromosomal reads) allows for parallelized deduplication without the need for a costly merge step. In contrast, HugeSeq chromosomal parallelization breaks correspondence between read pairs that are not mapped to the same chromosome, preventing appropriate deduplication and reducing data quality.

The second point at which different segments are codependent occurs during base quality score recalibration. Best practices suggest that a true measure of base qualities examines of covariates across the sample to provide empirically accurate base quality scores for each base in each read, and correct for multiple error covariates. The genomic processing system accomplishes this by generating covariate tables for each subregion and merging them into a single recalibration table for the sample. Recalibration is then applied in parallel to each subregion, producing identical results to recalibration applied to a single merged BAM of the entire genome. Furthermore, by avoiding downsampling at this stage, and taking into account qualities of the bases for a given sample, identical results can be produced every time recalibration is performed. By contrast, HugeSeq applies the GATK count covariates function by chromosome, resulting in incomplete information about the quality score distribution, thereby reducing the effectiveness of the recalibration process.

Enabling Highly Scalable Parallelization and Improves Computational Efficiency

In addition to faster performance, the genomic processing systems and method described herein define and/or initiate relatively more independent processes and eliminate costly single-threaded merge steps, leading to improved resource utilization and efficient load balancing (FIG. 6A). Moreover, given the memory intensive nature of NGS analysis the memory load can be efficiently spread across multiple machines. The ability to analyze multiple chromosomal subregions in parallel enables the genomic sequencing system to efficiently scale with many hundreds of parallel processes, with scalability limited by the need for a few synchronization points and the inherently serial steps (e.g. deduplication cannot start until the FASTQ file pairs have been aligned), while alternative pipelines failed to scale efficiently beyond 24 parallel processes (FIG. 7A). As such, the parallelization approaches of the genomic processing system can enable distributed big data analysis technologies, such as Hadoop, to be utilized as the method allows highly structured data to be divided into smaller components without (or with minimal) loss of data integrity. As a result of these improvements in scalability and efficiency, aspects disclosed herein enable efficient completion of an entire whole genome analysis, from raw sequence reads to a recalibrated VCF file, with either UnifiedGenotyper (FIG. 7B) or HaplotypeCaller (FIG. 9B).

Through use of alternative strategies for parallelization, GATK-Queue and HugeSeq achieve a moderate degree of parallelism and speedup). GATK-Queue processes raw reads from multiple unaligned BAM files in parallel; realignment, base quality score recalibration, and genotyping are performed on multiple sub-chromosomal "intervals" to achieve a high degree of parallelism. However, deduplication is carried out on a single merged BAM file and its workflow merges the BAM files after realignment and after recalibration.

These three lengthy single-threaded processes counteract the savings achieved through the sub-chromosomal interval parallelism, and average CPU utilization is less than 30% throughout the run (see FIG. 6A). The HugeSeq pipeline performs faster than GATK-Queue by performing parallelization at the chromosome level, thereby circumventing the BAM merging processes. However, this approach results in sub-optimal results due to inappropriate deduplication of interchromosomal reads and a failure to consider all base qualities simultaneously during recalibration. Additionally parallelization by chromosome limits scalability and suffers from poor load balancing due to the fact that human chromosomes vary greatly in size (FIG. 2).

Improved performance was observed with the bcbio-nextgen pipeline, but elements of the parallelization strategy implemented by this software have similar limitations as GATKQ. The alignment, deduplication and BAM indexing steps are parallelized by using the built-in multi-threading capabilities of BWA and sambamba producing a single merged BAM file, and as such limits parallelization of these steps to a single machine. This merge requirement of the bcbio-nextgen pipeline is avoided via independent processing of reads spanning subregions in an artificial chromosome. The streaming deduplication approach used by sambamba does avoid Picard tools deduplication requirement to read alignment results from disk and may result in a modest improvement in performance by reducing I/O. However, the genomic processing system's highly efficient parallelized deduplication strategy enables that stage of the analysis process to be efficiently completed. bcbio-nextgen parallelizes variant calling by partitioning the genome into regions that can be processed substantially simultaneously such as, for example, using an approach similar to the '677 application. These regions are bounded by spans of the genome that contain no callable reads in the samples that are being processed. Although this approach is superior to parallelizing by chromosome and enables parallelization across multiple machines, it is still subject to processing regions of differing sizes which performs and scales less well than the genomic processing system, which uses regions of equal size, thereby achieving optimal and/or improved load balancing and highly efficient resource utilization (FIG. 9A)

Balanced Parallelization Dramatically Speeds Up Whole Genome Variant Discovery and Genotyping Via Local Re-Assembly of Haplotypes Haplotype-based variant detection methods, such as FreeBayes and HaplotypeCaller, in which variant discovery and genotyping is performed by local re-assembly of haplotypes, may reduce false positive calls due to errors in short read alignment, but are considerably more computationally expensive than methods that operate on a single position at a time. In collaboration with Intel®, the Broad Institute recently developed a set of hardware-based optimizations for the PairHMM method in HaplotypeCaller enabling them to reduce the time to analyze a single genome from three days to one day (a three-fold speedup). Utilization of the balanced parallelization approach(es) of the genomic processing system, in combination with AWS EC2 instances equipped with Intel Xeon® processors that can utilize the HaplotypeCaller routines optimized for Intel® Advanced Vector Extensions, enabled whole genome variant calling and genotyping about 60-fold faster (FIG. 9B). This resulted in a similar run time performance as UnifiedGenotyper (FIG. 7) and enabled complete genome analysis in 1 hour 44 minutes using on-demand Cloud resources, without any sacrifice in data quality (FIG. 9). While HaplotypeCaller is a more sophisticated method than UnifiedGenotyper, it has been reported that the HaplotypeCaller indels have an increased false discovery rate and significantly lower validation rates for both SNP and indel calls than UnifiedGenotyper. As such, the parallelization approach(es) of the genomic processing system provide users with options for variant discovery and genotyping with UnifiedGenotype, HaplotypeCaller or FreeBayes, and are readily adaptable to be used by other variant calling tools.

Enabling Rapid Clinical Genomic Analysis

Routine adoption of NGS clinically has been impeded by the complexity of the bioinformatics and the lack of a data analysis solution that is simple, fast and accurate. The genomic processing system eliminates the genomic analysis bottleneck for a clinical laboratory, transforming a complex workflow to a single command while observing currently accepted best practices for discovery of genetic variation. The secondary analysis workflow (from FASTQ to VCF) for a single sample can be, for example, completed in less than an hour for an exome or targeted panel and under 2 hours for a whole genome. The speed at which NGS analysis is completed will have a major impact in the clinic where fast turnaround can be essential for diagnosis of genetic disease. For instance, rapid diagnosis is critical for newborns with suspected monogenic diseases, where diagnosis is confounded by ambiguous symptoms and progression is rapid, frequently leading to morbidity and mortality. Validation using the GIAB Consortium reference sample demonstrated that the genomic processing system had the highest overall sensitivity (99.7%) and accuracy (99.9988%) of the pipelines assessed (FIG. 8). In addition to speed and genotyping accuracy, the genomic processing system's deterministic performance sets a NGS analysis standard of 100% reproducibility without sacrificing data quality.

Enabling Population-Scale Genomic Analysis in the Cloud

The genomic processing system not only optimizes and/or improves the workflow for clinical analysis of single whole genome or targeted capture samples, but also for much larger research data sets. To demonstrate this, the 1000 Genomes raw dataset of 1088 individuals was analyzed using the cloud (AWS EC2). The analysis process was efficiently parallelized, from FASTQ raw input data through multi-sample variant calling, generating population allele frequencies in under a week (FIG. 10). A smaller scale simultaneous analysis of 61 human genomes was recently performed in 2 days with a Cray XE6 supercomputer, averaging-50 minutes per genome. Through utilization of universally available on demand cloud resources, analysis was completed-5 times faster, averaging-9 minutes per genome, using one third of the compute resources of the Cray supercomputer. Additionally, this undertaking demonstrates the feasibility of generating population allele frequencies specific to a given unified analysis approach, resulting in the discovery of –3,000,000 novel indels. Identification of rare pathogenic variation will be aided by supplementing 1 KG consortium allele frequencies with specific allele frequencies generated in this current analysis.

While various embodiments have been described herein, it should be understood that they have been presented by way of example, and not limitation. Where methods described above indicate certain events occurring in certain order, the ordering of certain events may be modified. Additionally, certain of the events may be performed concurrently in a parallel process when possible, as well as performed sequentially as described herein.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example, and not limitation. Where methods described above indicate certain events occurring in certain order, the ordering of certain events can be modified. Additionally, certain of the events may be performed concurrently in a parallel process when possible, as well as performed sequentially as described above.

Abbreviations

1 KG: 1000 Genomes Project; AWS: Amazon Web Services; BAM: binary sequence alignment map format; CPU: central processing unit; EC2: Elastic Compute Cloud; GATK: Genome Analysis Toolkit; GIAB: Genome in a Bottle Consortium; indels: small deletions and insertions; NGS: next generation sequencing; PBS: Portable Batch System; SAM: sequence alignment map format; SGE: Sun Grid Engine; SNP: single nucleotide polymorphism; VCF: variant call format.

TABLE 1

Table 1. Comparison of parallelization environments vs. parallelization methods.

| Parallelization method | Parallelization environment | | |
|---|---|---|---|
| | Shared memory | PBS | SGE |
| Xargs | Yes | No | No |
| GNU Make | Yes | Yes (via distmake) | Yes (via qmake/distmake) |
| Qsub | No | Yes | Yes |

Table 1. Comparison of parallelization environments vs. parallelization methods.

What is claimed is:

1. A parallel processing system, comprising:
a processing device having a plurality of processors configured to perform a predefined set of operations in response to receiving at least one sequence, the processing device comprising memory operably connected to the plurality of processors and where the at least one sequence is stored, wherein each of the at least one sequences includes an estimation of a biological sequence comprising at least two chromosomes and a plurality of elements;
wherein a first processor of the plurality of processors is configured to:

split a sequence of the at least one sequence from the memory into a plurality of segments;

map and subsequently assign each element from the plurality of elements to at least one segment from the plurality of segments wherein each segment is less than a length of a chromosome of the at least two chromosomes;

wherein when the first processor has mapped an element from the plurality of elements to at least a first segment and a second segment from the plurality of segments, assign the element from the plurality of elements to the first segment and the second segment, each segment from the plurality of segments including a portion having a first size overlapping a portion of at least one remaining segment from the plurality of segments;

wherein the first processor of the plurality of processors splits each segment into an equal length;

wherein the first processor and a second processor of the plurality of processors are configured to:

substantially simultaneously, remove from each segment of the plurality of segments, and from each segment of a set of segments specific to the second processor, at least a portion of duplicate elements in each segment of the sets of segments to generate a deduplicated segment, the deduplicated segment generated for each segment of the plurality of segments including a portion having a second size overlapping a portion of the deduplicated segment associated with a remaining segment from the plurality of segments, the second size being smaller than the first size; and reorder the elements in the deduplicated segment to generate a realigned segment, the realigned segment having a reduced likelihood for alignment errors relative to the deduplicated segment.

2. The system of claim 1, wherein responsive to the second processor receiving a first sequence, the first sequence including a forward estimation of the biological sequence, and receiving a second sequence, the second sequence including a reverse estimation of the biological sequence, the second processor generates a paired sequence based on the first sequence and the second sequence, and aligns the paired sequence with a reference sequence to generate a target sequence.

3. The system of claim 1, wherein the sequence of the at least one sequence is in a binary alignment/map (BAM) format or in a FASTQ format.

4. The system of claim 1, wherein the biological sequence is one of a deoxyribonucleic acid (DNA) sequence or a ribonucleic acid (RNA) sequence.

5. A non-transitory computer readable medium storing instructions executable by an associated processor to perform a method for parallel processing of biological sequence data comprising:

receiving a sequence, the sequence including an estimation of a biological sequence comprising at least two chromosomes, the sequence including a plurality of elements;

splitting the sequence into a plurality of segments, wherein each segment is an equal length, the equal length being less than a length of a chromosome of the at least two chromosomes;

assigning each element from the plurality of elements to at least one segment from the plurality of segments;

wherein responsive to an assigned element from the plurality of elements mapping to both a first segment and a second segment of the plurality of segments, mapping and subsequently assigning the element from the plurality of elements to both the first segment and the second segment, wherein each segment of the plurality of segments has a first portion having a first size overlapping a portion of a remaining segment of the plurality of segments; and for each segment from the plurality of segments assigning the segment to at least one of a first processor or a second processor, and assigning at least another segment to the other of the first processor or the second processor;

substantially simultaneously using the first and second processor, for each segment of the plurality of segments to:

remove at least a portion of duplicate elements in the segment to generate a deduplicated segment, the deduplicated segment, associated with each segment of the plurality of segments, generated to include a second portion having a second size overlapping a portion of a deduplicated segment associated with a remaining segment of the plurality of segments, the first size different than the second size;

reorder the elements in the deduplicated segment to generate a realigned segment, the realigned segment having a reduced likelihood for alignment errors relative to the deduplicated segment; and transmit the realigned segment to one or more of a memory device of a processing device and a genotyping processor of the processing device.

6. The non-transitory computer readable medium storing instructions executable by the associated processor to perform the method for parallel processing of biological sequence data of claim 5, further comprising responsive to receiving a first sequence and a second sequence, the first sequence including a forward estimation of the biological sequence and the second sequence including a reverse estimation of the biological sequence:

generating a paired sequence based on the first sequence and the second sequence; and aligning the paired sequence with a reference sequence to generate a target sequence.

7. The non-transitory computer readable medium storing instructions executable by the associated processor to perform the method for parallel processing of biological sequence data of claim 5, further comprising:

splitting the sequence into a plurality of subsequences, and assigning each subsequence from the plurality of subsequences to at least one segment from the plurality of segments.

8. The non-transitory computer readable medium storing instructions executable by the associated processor to perform the method for parallel processing of biological sequence data of claim 5, further comprising responsive to an element of the plurality of elements mapping to the first segment and the second segment of the plurality of segments, assigning the first segment and the second segment to an intersegmental sequence.

9. The non-transitory computer readable medium storing instructions executable by the associated processor to perform the method for parallel processing of biological sequence data of claim 5, wherein the sequence is in a binary alignment/map (BAM) format or in a FASTQ format.

10. The non-transitory computer readable medium storing instructions executable by the associated processor to perform the method for parallel processing of biological sequence data of claim 5, wherein the sequence includes quality score information.

11. The non-transitory computer readable medium storing instructions executable by the associated processor to perform the method for parallel processing of biological sequence data of claim 5, wherein each element of the plurality of elements includes a read pair.

12. The non-transitory computer readable medium storing instructions executable by the associated processor to perform the method for parallel processing of biological sequence data of claim 5, wherein the biological sequence is one of a deoxyribonucleic acid (DNA) sequence or a ribonucleic acid (RNA) sequence.

13. The non-transitory computer readable medium storing instructions executable by the associated processor to perform the method for parallel processing of biological sequence data of claim 5, wherein the second size is smaller than the first size.

14. The non-transitory computer readable medium storing instructions executable by the associated processor to perform the method for parallel processing of biological sequence data of claim 5, wherein generating the realigned segment comprises generating the realigned segment such that the realigned segment associated with each segment of the plurality of segments includes a portion having a third size overlapping a portion of a realigned segment associated with a remaining segment of the plurality of segments, the second size being smaller than the first size, the third size being smaller than the second size.

15. A parallel-processing apparatus, comprising:
a processing device comprising a plurality of processors and memory storing a sequence, including an estimation of a biological sequence comprising at least two chromosomes including a plurality of elements;
an assignment processor of the plurality of processors, wherein the assignment processor is configured to:
split the sequence into a plurality of segments, wherein each segment is an equal length, that equal length less than a length of a chromosome of the at least two chromosomes;
assign each element from the plurality of elements to at least one segment from the plurality of segments; and
responsive to an element from the plurality of elements mapping to at least a first segment and a second segment from the plurality of segments, map and assign the element from the plurality of elements to both the first segment and the second segment; and
first and second segment processing processors of the plurality of processors operatively coupled to the assignment processor, the first segment processing processor configured to for at least one segment of the plurality of segments and the second segment processing processor configured to, substantially simultaneously with the first segment processing processor, for an other segment from the plurality of segments:
remove at least a portion of duplicate elements in the segment to generate a deduplicated segment, the deduplicated segment generated to include a first duplicate portion having a first size overlapping a second duplicate portion of at least one remaining deduplicated segment; and
reorder the elements in the deduplicated segment to generate a realigned segment, the realigned segment generated to include a first realigned portion having a second size overlapping a second realigned portion of at least one remaining realigned segment, the first size different than the second size, the realigned segment having a reduced likelihood for alignment errors relative to the deduplicated segment.

16. The apparatus of claim 15, wherein a target sequence is generated, the assignment-processor further configured to receive a first sequence, the first sequence including a forward estimation of the biological sequence:
receive a second sequence, the second sequence including a reverse estimation of the biological sequence;
generate a paired sequence based on the first sequence and the second sequence; and
align the paired sequence with a reference sequence to generate the target sequence.

17. The apparatus of claim 15, further comprising a parallelization processor of the plurality of processors configured to, prior to the assigning by the assignment processor, split the sequence into a plurality of subsequences,
the assignment processor configured to assign by assigning each subsequence to at least one segment from the plurality of segments, the assignment processor further configured to execute the assigning for at least two segments from the plurality of segments in a simultaneous manner,
the parallelization processor further configured to, for each segment from the plurality of segments, subsequent to the assigning by the assignment processor and prior to the removing by the segment processing processor, combine subsequences within that segment.

18. The apparatus of claim 15, wherein the sequence is in a binary alignment/map (BAM) format or in a FASTQ format.

19. The apparatus of claim 15, wherein the biological sequence is one of a deoxyribonucleicacid (DNA) sequence or a ribonucleic acid (RNA) sequence.

* * * * *